United States Patent [19]

Law

[11] 4,410,970
[45] Oct. 18, 1983

[54] METHOD AND APPARATUS FOR MEASURING AND ANALYZING SOUND CHARACTERISTICS OF RECORD DISCS

[75] Inventor: Kenneth S. K. Law, Granada Hills, Calif.

[73] Assignee: Keysor-Century Corporation, Saugus, Calif.

[21] Appl. No.: 275,592

[22] Filed: Jun. 19, 1981

[51] Int. Cl.³ ............................................. G11B 3/00
[52] U.S. Cl. ......................................... 369/58; 73/659;
324/77 D; 364/485
[58] Field of Search .............................. 73/659; 369/58;
324/77 B, 77 D; 364/485

[56] References Cited

U.S. PATENT DOCUMENTS 3,881,097 4/1975 Lehmann et al. .................. 324/77 D
3,995,500 12/1976 Schomer .................................. 73/659

FOREIGN PATENT DOCUMENTS 1068096 12/1959 Fed. Rep. of Germany ........ 369/58
1245609 12/1964 Fed. Rep. of Germany ........ 369/58

Primary Examiner—Howard A. Birmiel
Attorney, Agent, or Firm—Robert J. Schaap

[57] ABSTRACT

A method and apparatus for quantitatively measuring sound from a phonographic-type record disc and using such measurements to analyze the sound characteristics and to thereby improve the sound recording. Selection of one or more sound samples to be taken from a phonographic-type record disc are made and electrical signals representative of these samples on the record disc are generated. These signals may be filtered in order to obtain individual frequency bands and decibel levels for each of the frequency bands is determined. Decibel levels for certain of or all frequencies or bands of frequencies for each sample may be averaged. In this way, it is possible to obtain signals representing decibel levels as a function of frequency for each discrete sample. The signals are used to present a profile of the decibel levels with respect to the frequency and for the selected time interval of each sample in order to thereby enable evaluation of the sound characteristics of that record disc. By using this method and the apparatus capable of carrying out this method, it is possible to determine the possible source and origin of any imperfections in the disc, and e.g., whether or not the imperfections were a result of the material used to create the phonographic-type record disc or whether or not the imperfections resulted from one or more steps in the fabrication of the record discs.

66 Claims, 21 Drawing Figures

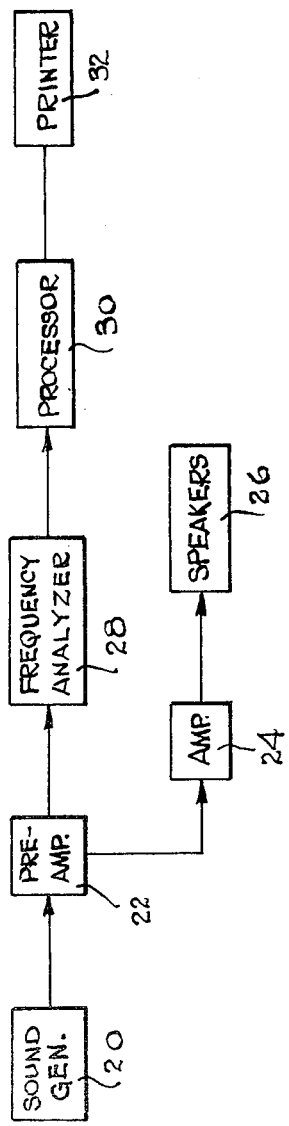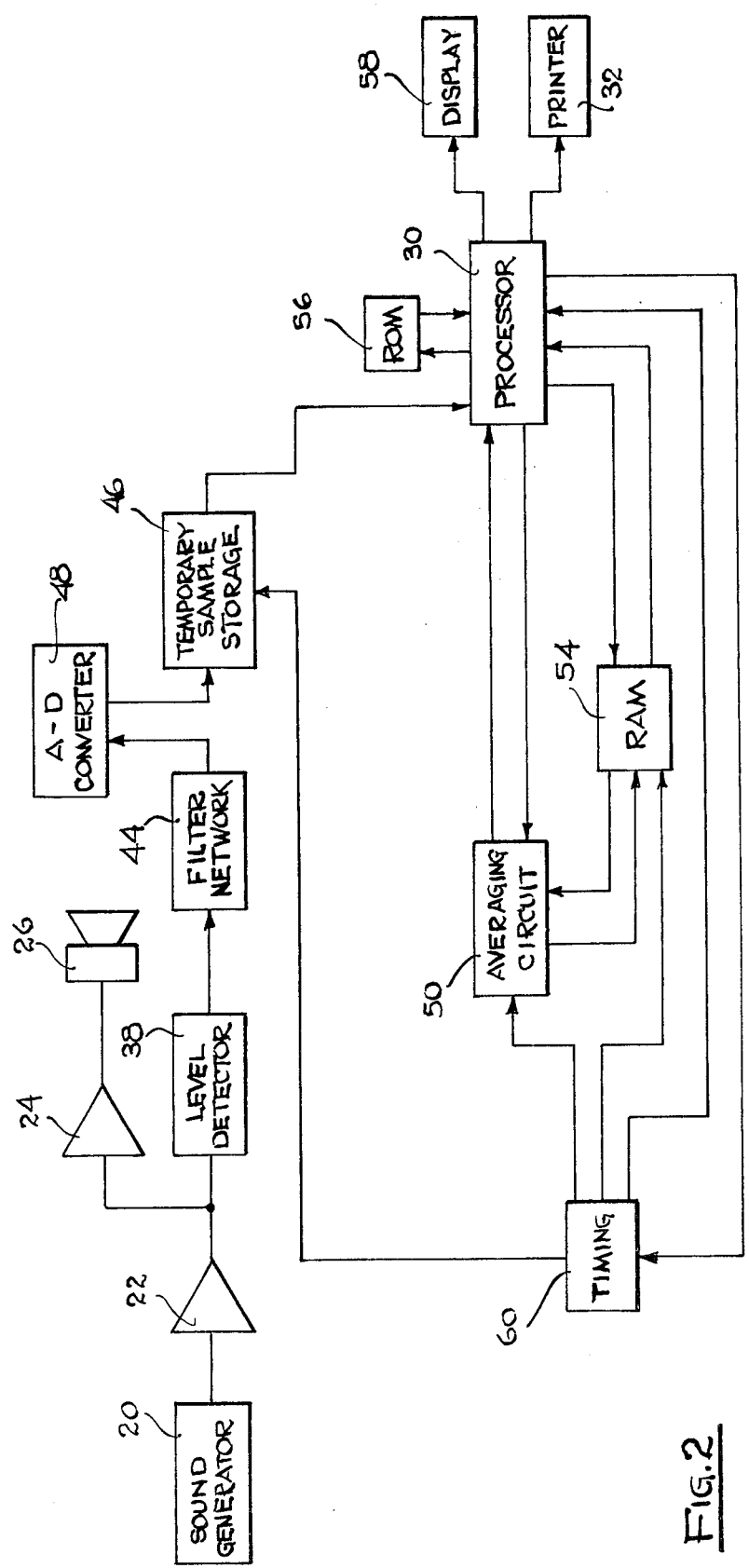

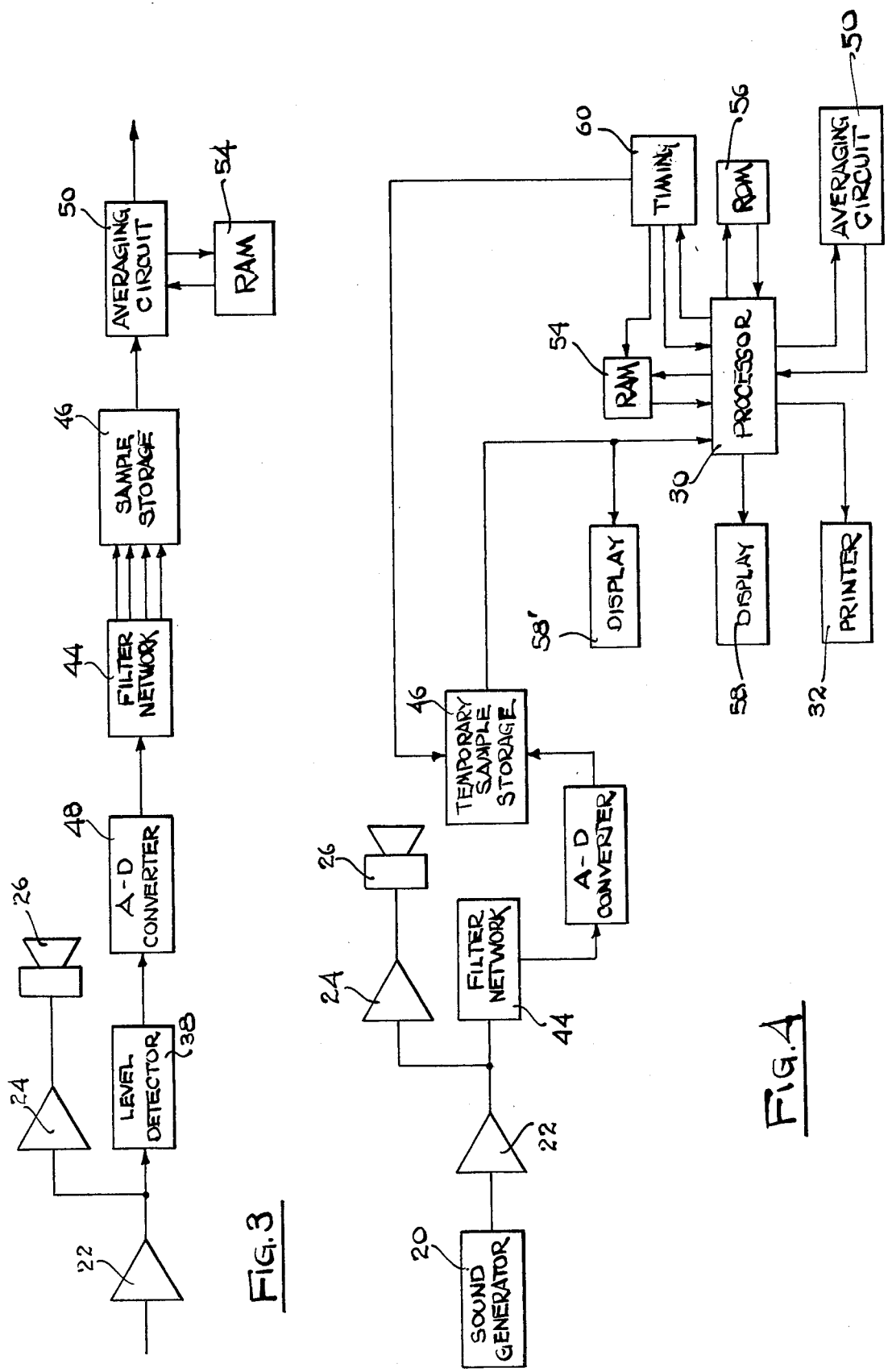

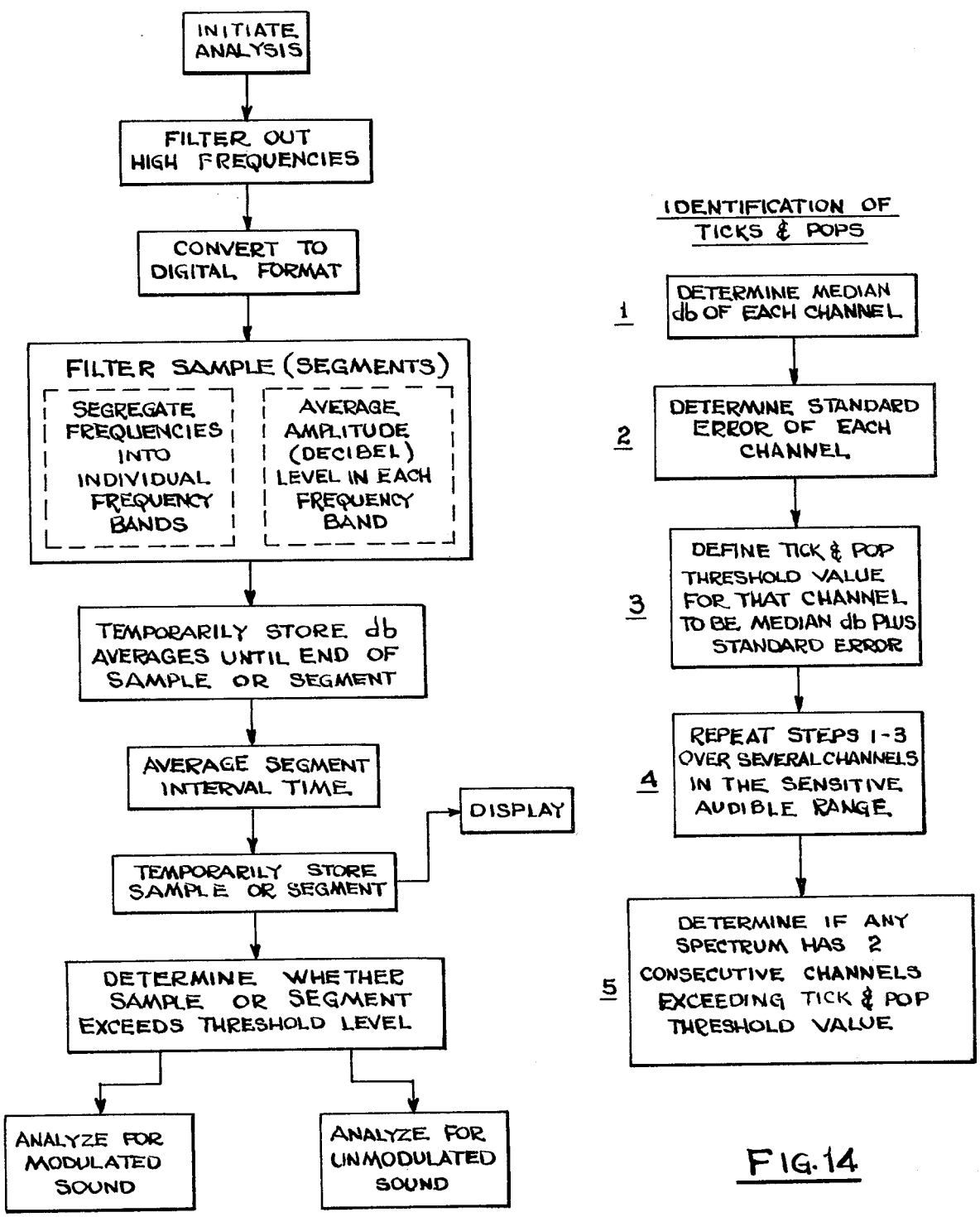

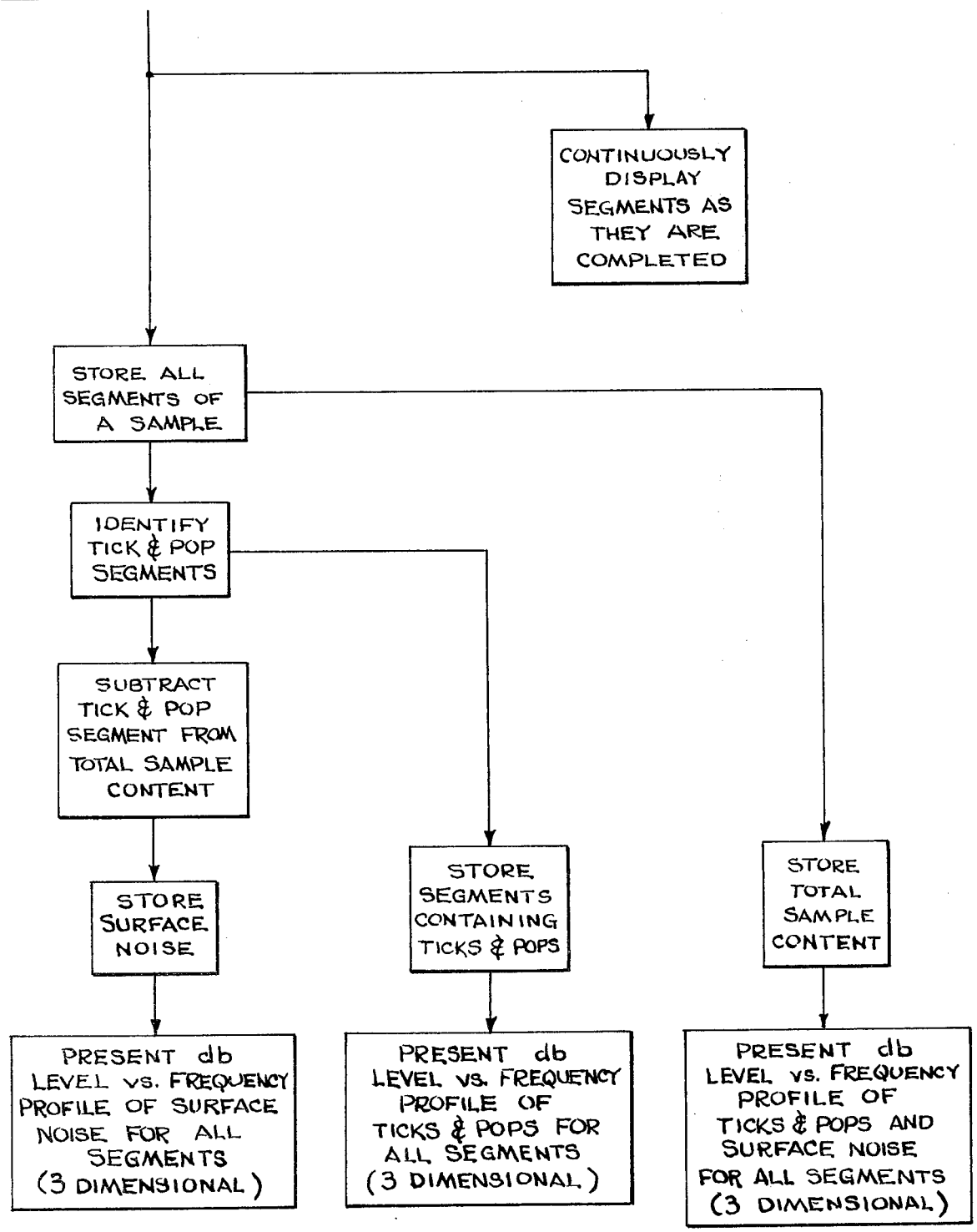

METHOD AND APPARATUS FOR MEASURING AND ANALYZING SOUND CHARACTERISTICS OF RECORD DISCS

BACKGROUND OF THE INVENTION

1. Field of the Invention

This invention relates to sound analysis and in particular to a method and apparatus for quantitatively measuring and analyzing sound characteristics in phonographic-type record discs.

2. Brief Description of the Prior Art

Most phonographic-type record discs are presently made from a tape, e.g., a magnetic tape used to initially record the desired sounds for reproduction and this recording on the tape typically takes place in a sound recording studio. Thereafter, the tape may be used to produce a master record disc. In producing a master record disc, elecrical signals representative of these sounds on the tape are used to vibrate a cutting tool which cuts a groove into the base material or so-called "lacquer" used to ultimately form the master record disc, and which lacquer is typically formed of a nitro-cellulose material.

In order to form the master, the so-called "lacquer" is then plated, e.g., by spraying or the like with a conductive metal such as silver. The silver coated lacquer is then dipped into a nickle bath to form a nickle plating. The nickle plating is peeled off and this plating constitutes, the record disc master since it contains grooves representative of the sounds generated from the tape.

The master record disc, which is used to generate the so-called "mother", contains grooves which are a positive of the sounds on the record tape and thus, any reproduction from them other would produce a record disc containing a negative form of the sounds. Accordingly, the mother is plated in a manner as previously described, and this plating when removed contains a negative of the sounds on the recorded tape. This latter plating often referred to as a "stample" is used to produce copies of record discs in a conventional record disc producing press. In some cases the steps of producing the master and the mother are eliminated and the stample may be produced directly from the lacquer, in which case the stample is sometimes referred to as the master record disc.

Generally, the phonographic disc, usually polyvinyl chloride, does not hold an exact shape when it is pressed. Usually, the disc holds the shape associated with most frequencies, but it may not hold the shape peculiar to certain frequencies. Thus, the phonographic record disc may not be able to accurately reproduce the entire original sound wave. Specifically, the record exhibits a loss or a distortion in the reproduction of certain frequencies.

A certain amount of surface noise is associated with all record materials. This noise is characteristic of the particular material and, hence, the sound qualities, such as loudness, differ from one material to the next. Other noises may be produced by the record which are independent of this surface noise. These other noises may be randomly dispersed high decibel levels, which can result from imperfections in the record surface, such as those caused by voids or contaminants. The voids and contaminants might be introduced in any of the steps which take place during fabrication of the master or stample itself or they may be later introduced during molding of the disc. It is, of course, desirable to be able to differentiate the sources of the noise in order to determine the best steps to minimize or eliminate them.

The record discs fabricated from different materials have different reproduction characteristics and capabilities. Some materials may not be capable of accurately reproducing all of the audible frequencies. Hence, in evaluating materials for phonographic discs, it is necessary to take into consideration, not only the surface noise level, and the ease with which voids and contaminants; may be minimized, but also the reproduction characteristics of the material.

Digital frequency analyzers have been used in connection with computers for making vibration analysis. This type of system is frequently employed to analyze and study vibrations in certain equipment. This type of system has also been used to predict and study earthquakes In addition, microphones have been used to inroduce signals into a digital frequency analyzer which generates wave forms in response to the signals introduced. Further, frequency analyzers have been used in equalizing the sound across "sound rooms", e.g., rooms environmentally isolated to hear certain sounds created therein, in order to eliminate or compensate for reverberations and the like.

Heretofore, none of these systems have been used for or capable of effectively analyzing signals made by phonographic record discs to determine the reproduction capabilities of the material or to quantify surface noise levels separately from other noise levels. In addition, none of the prior art systems thus configured has been able to analyze sound waves generated by phonographic record discs to discover the causes of high level noise areas on the discs or to quantify such high level noise on record discs.

OBJECTS OF THE INVENTION

It is, therefore, an object of the present invention to provide a method and apparatus for analyzing sound waves generated by a phonographic record disc to determine the reproduction capabilities for the material used in the fabrication of the record disc.

It is another object of the present invention to provide a method and apparatus of the type stated for analyzing sound waves generated by a phonographic record disc to determine the surface noise level of the material used in the fabrication of the disc.

It is a further object of the present invention to provide a method and apparatus of the type stated for analyzing sound waves generated by a phonographic record disc to separate noise levels caused by surface noise from noise levels caused by voids or contaminants in the disc.

It is an additional object of the present invention to provide a method and apparatus for analyzing sound waves produced by phonographic record discs to determine the causes of high level noise areas on the disc.

It is also an object of the present invention to provide a method and apparatus of the type stated in which a profile of a decibel level with respect to frequency can be presented for each sound sample selected from the record disc in order to enable an evaluation of sound characteristics of that record disc.

It is still another object of the present invention to provide a method and apparatus to enable one type of record disc to be compared to another type of record disc for both modulated and unmodulated sound characteristics.

It is still a further object of the present invention to provide a method and apparatus of the type stated which permits a determination as to whether or not the existence of unwanted noise in a sound spectrum of a copy of a record disc was a result of fabrication procedures in the record disc, or was a result of the imperfections in a master of the record disc used to produce such copy.

It is another salient object of the present invention to provide a method of analyzing the imperfections on a record disc giving rise to unmodulated sound and which imperfections are not readily discernable by visual observation, in order to thereby eliminate or reduce such imperfections.

With the above and other objects in view, my invention resides in the novel features of form, construction, arrangement and combination of parts forming part of the apparatus and in the various steps in the method of measuring and analyzing which forms part of the present invention.

SUMMARY OF THE DISCLOSURE

The present invention relates to a unique apparatus and unique method for measuring and analyzing sound characteristics of phonographic-type record discs, and more specifically, for quantitatively measuring and analyzing sound characteristics of these record discs. In the illustrated and described embodiments of the invention, it is possible to measure either modulated or unmodulated sound, or both the modulated and unmodulated sound.

Phonographic-type record discs can be fabricated by molding, e.g., by compression molding any of a number of known materials, such as polyvinyl chloride, in a conventional record disc producing operation with conventional molding equipment. Further, a large number of record discs may be made from one or more individual stamples containing grooves (in a negative format). In many cases, the stample is referred to as the master, although it is merely a copy of the master, but in a negative format. In some cases, the intermediate steps of producing a master and so-called "mother" are eliminated such that the stample is sometimes referred to as the master. Thus, for the purposes of this invention the stample may be hereinafter referred to as a master. In practically all copies of record discs, there are imperfections in such copies of the record discs which may derive from various sources. It has been established that a large percentage of the imperfections arise from either materials used in the fabrication of the record discs or otherwise in the steps of the fabrication process.

In a broad aspect of the invention, the method relates to the quantitative measuring of sound from phonographic-type record discs and using the quantitative measurement to improve the sound recording. In this embodiment, one or more samples to be taken from the record disc are selected. The samples are typically certain areas of the record disc in which sound is to be measured and thereafter analyzed. An electrical signal representative of the sound from each of the selected samples of the record disc is then generated. These signals are preferably filtered in order to obtain decibel levels for each of the frequencies or bands of the frequencies. In addition, other statistical measurements may be made for each of the samples in order to enable a presentation of a profile of the decibel level with respect to frequency for each of the selected samples and in this way enable an evaluation of the sound characteristics of the record disc.

In a more specific aspect, a threshold level is established before any analysis and measurement is made. This threshold level may adopt the from of the amplitude of the signal. Further, in accordance with the method, the determined average for the decibel level of a certain frequency band is stored until the average of the decibel level for each frequency band in the entire sample has been determined.

In order to determine whether or not the sound imperfection was a result of the process steps or the materials used, the process may be repeated with different phonograhic-type record discs in order to compare the decibel levels with respect to the frequency profiles for each record. Further, it is possible to determine the sources of imperfections, particularly in the unmodulated sound of a record disc. A spectrum containing ticks and pops and a spectrum containing a general surface noise level can be obtained. In making such evaluations, it is only necessary to use a copy of the record disc and not the master or stample of the record disc.

One or more samples may be taken from the same record disc in different portions of the record disc. In addition, in accordance with the present invention, one or more samples may be taken and in each sample a group of sample segments may be taken. Thus, for example, in a complete sample, a number of sample segments, e.g., thirty-six sample segments may be taken with a relatively short pause or non-sampling period between each segment of the sample.

It can be observed that when a group of sample segments are taken from one sample, each sample segment represents one time frame. Each sample segment occurs in a discrete time interval and all time intervals of all segments in a sample represent a specified time domain for that sample. Thus, a first segment may last for, e.g., 31.25 milliseconds, and a second segment may last for another 31.25 milliseconds and so on with a gap of approximately 12.75 milliseconds between each segment, and all segments together may represent a 1584 millisecond (1.584 second) time domain. The total time interval for a sample segment of 31.25 milliseconds and associated gap or pause of 12.75 milliseconds is 44 milliseconds. It should be understood that these times may vary depending on the particular analysis to be made.

More specifically and in one embodiment of the invention, a signal or group of signals are generated for each sample or segment of a sample (as hereinafter described) and which signal represents the decibel level for each of the various frequencies in the particular sample or segment. A signal or group of signals are generated for each of the additional samples or successive segments of the same sample which also represent the decibel level for each of the various frequencies in such samples or segments of each sample. More specifically, these signals represent the averaging of the decibel level for each given frequency band of frequencies.

In actuality, the decibel level of each frequency band in a sample or segment of a sample is an average with respect to a center frequency of a small frequency range. For example, a frequency designated as 325 represents a center frequency of a frequency band. Also, since the decibel level for each frequency in a band may be different, the decibel level for a band is an average of decibels for all frequencies within that band.

Each segment of a sample will have a group of successive common frequency bands. Thus, for example, each segment of a sample will have a frequency band represented by a center frequency of 325 Hz, a frequency band represented by a center frequency of 400 Hz, etc. The common frequency bands of each sample segment are referred to as "channels". Thus, for example, the 325 Hz band of each segment is grouped so that all of the segments of the sample will form a channel of 325 Hz, all segments of the sample will form another channel of 400 Hz, etc. The decibel level across each channel may be averaged, that is, the average of the decibel level for each sample segment in the 325 Hz band will be obtained, the average of the decibel level for each sample segment in 400 Hz band may be obtained and so forth.

As an alternative, each segment may be averaged, i.e., the decibel levels for all frequency bands in a segment may be averaged to thereby acquire a segment average number. The segment average number for all segments of the sample may then be averaged across the entire time domain of an entire sample. In addition, other statistical measurements in place of or in addition to averaging, e.g., measuring a median, may be made.

The signals or otherwise the signal components representing decibel levels as a function of frequency for each of the samples or sample segments which represent discrete time increments, is plotted. It is therefore possible from the plotted signal components to determine the existence of unwanted noise in the sound spectrum of a copy of a record disc. Further, it is possible to determine from a copy of this record disc if the unwanted noise occurred in a particular record disc or was derived from a master or stample of the record disc, used to produce such copies of the record disc.

More specifically, in the analysis of unmodulated sound, the electrical signals which are generated can be processed to provide a first signal function representing unmodulated surface noise from the record disc. A second signal function representing ticks and pops, if any, can be provided, and finally, a third signal function representing a combination of the surface noise and ticks and pops can be provided. Each of the signal functions are plotted in order to obtain a first plot of background noise without ticks and pops, a plot of ticks and pops without the background noise and finally, a plot of combined background noise and ticks and pops. The signal functions do not have to be generated in this order, and for example, the signal functions may represent certain averages which are simultaneously generated. In a more preferred aspect, the signal function representing a combined plot of background noise and ticks and pops is generated first. Thereafter, the signal function representing background noise and the signal function representing ticks and pops is extracted therefrom.

As indicated previously, it is desirable to commence the analysis when a signal reaches a minimum threshold level. This minimum level assures that the signal being analyzed is an unmodulated signal and facilitates reproducable points to start each analysis.

The ticks and pops are generally easier to detect and analyze in the modulated portions of the record disc although they may occur throughout the record disc in both modulated and unmodulated portions. In order to determine the ticks and pops and sort the ticks and pops, a threshold sound level is determined and this threshold level is selected so as to be lower than any modulated signal. When the sound level diminishes below the selected threshold, the signal produced represents only surface noise and other unmodulated noise. Once the sound level drops below the threshold, the samples may be taken for the predetermined time interval. The average decibel level for each band is then determined and stored as previously described.

Any noise level in a particular frequency band which is greater than a statistical amount, e.g., a certain standard deviation of a distribution of decibel level, may be considered to be a tick and pop. Otherwise, for example, noise level of any segment sample greater than the average decibel level of the sample for that band, plus a statistically determined amount, may be considered to be noise, other than surface noise, as for example, ticks and pops. However, in order to be positively identified, a noise level higher than this amount must appear for a certain number of selected consecutive frequency bands, e.g., two consecutive frequency bands. Once the spectrum containing other noise has been identified, it may then be easily separated from the remaining spectrum which contains only the surface noise.

The present invention also relates to the apparatus for quantitatively meaasuring the sound from the phonographic-type record discs in order to enable improvement of the sound recording. In the broad aspect, the apparatus is comprised of a signal generating means for generating the electrical signals and a signal processing means for processing those electrical signals. In this way, the processed signals can be used to generate individual signal components representing decibel levels as a function of each of the frequencies or bands of the frequencies.

In a more specific aspect of the apparatus, a filter means may be used to divide the electrical siganls into individual frequency bands to predetermined frequency. Averaging means is provided for averaging the decibel levels for each of the frequency bands. Further, a temporary storage means may be operatively connected to the means for averaging for storing the determined average of a frequency band until the average for each band in the sample has been determined.

The apparatus also preferably includes means for generating a presentation representative of the sound from the record disc and in which the decibel level versus the frequency is one of the parameters which may be presented. In this way, it is possible to use this apparatus to enable the evaluation of the sound characteristics of the record discs in accordance with the method as previously described. In a more specific aspect, the presentation means plots signal components representing decibel levels as a function of time for discrete increments of the time during the sample.

Several embodiments of the apparatus are disclosed. In one embodiment of the apparatus, a level detector is operatively connected to a sound generator, such as the turntable, used to produce the signal, in order to determine whether or not the incoming signal has reached the desired threshold level for purposes of initiating the analysis. Thereafter, a filter network is used to divide the signal into the respective frequency bands. A sample storage is associated with and operatively connected to the output of the filter network for storing portions of the filtered sample until the entire sample or sample segment has been filtered. An analog-digital converter is interposed between the filter network and sample storage for converting the filtered signals into digital format. A processor is provided for controlling the process of analysis. An averaging circuit is connected to the processor for conducting the desired averaging under request of the processor. Thus, the averaging circuit is connected to a processor and operates in conjunction with the processor. The processor operates under the control of a random-access-memory and is also provided with an associated read-only-memory. A display and a printer may be connected to the outputs of the processor. All portions of the circuit are under the control of a central timing circuit.

In another embodiment of the apparatus, the analog-digital converter is connected directly to the output of a level detector and the output of the analog-digital converter is introduced directly into the filter network. Thus, in this embodiment, most of the entire analysis is conducted in digital format as opposed to the filtering in the analog format as previously described. Also, in this embodiment, the filter would adopt the form of a digital filter.

In yet another embodiment of the apparatus, no level detector, as such, is employed. The level detection is internally performed in the processor. Also, in this embodiment, a pair of displays are employed. Thus, one display is connected to the temporary storage which actually receives unaveraged signals and not any averaged signals. In this way, a continuous display may be performed whether or not the information is stored for purposes of ultimate analysis. Also, a second display is connected to the output of the processor for displaying information which may be further averaged and used. Thus, one can monitor all signals whether or not they achieve the threshold level and also monitor the signals which do exceed the threshold level and are used for purposes of analyzing the sound characteristics.

In still another embodiment of the apparatus, a sample and hold circuit along with the filter network is used for filtering the sample into the desired frequency bands. An analog-digital converter is interposed between the sample and hold circuit and the filter network and the analog-digital converter and the sample and hold circuit operate under a separate time control. The output of the filter network is operatively introduced into a segment producing averaging circuit which has a storage member associated therewith. Thereafter, a temporary storage receives the output of the segment producing averaging circuit and is connected to the processor for processing all such information. Here again, the processor operates under the control of a random-access-memory. Also, in this embodiment the use of root mean square detectors and linear-log converters along with square root extractors are disclosed.

This invention possesses many other advantages and has other purposes which may be made more clearly apparent from a consideration of forms in which it may be embodied. These forms are shown in the drawings accompanying and forming part of the present specification. They will now be described in detail, for the purposes of illustrating the general principles of the invention; but it is to be understood that such detailed descriptions are not to be taken in a limiting sense.

BRIEF DESCRIPTION OF THE DRAWINGS

Figure 5:
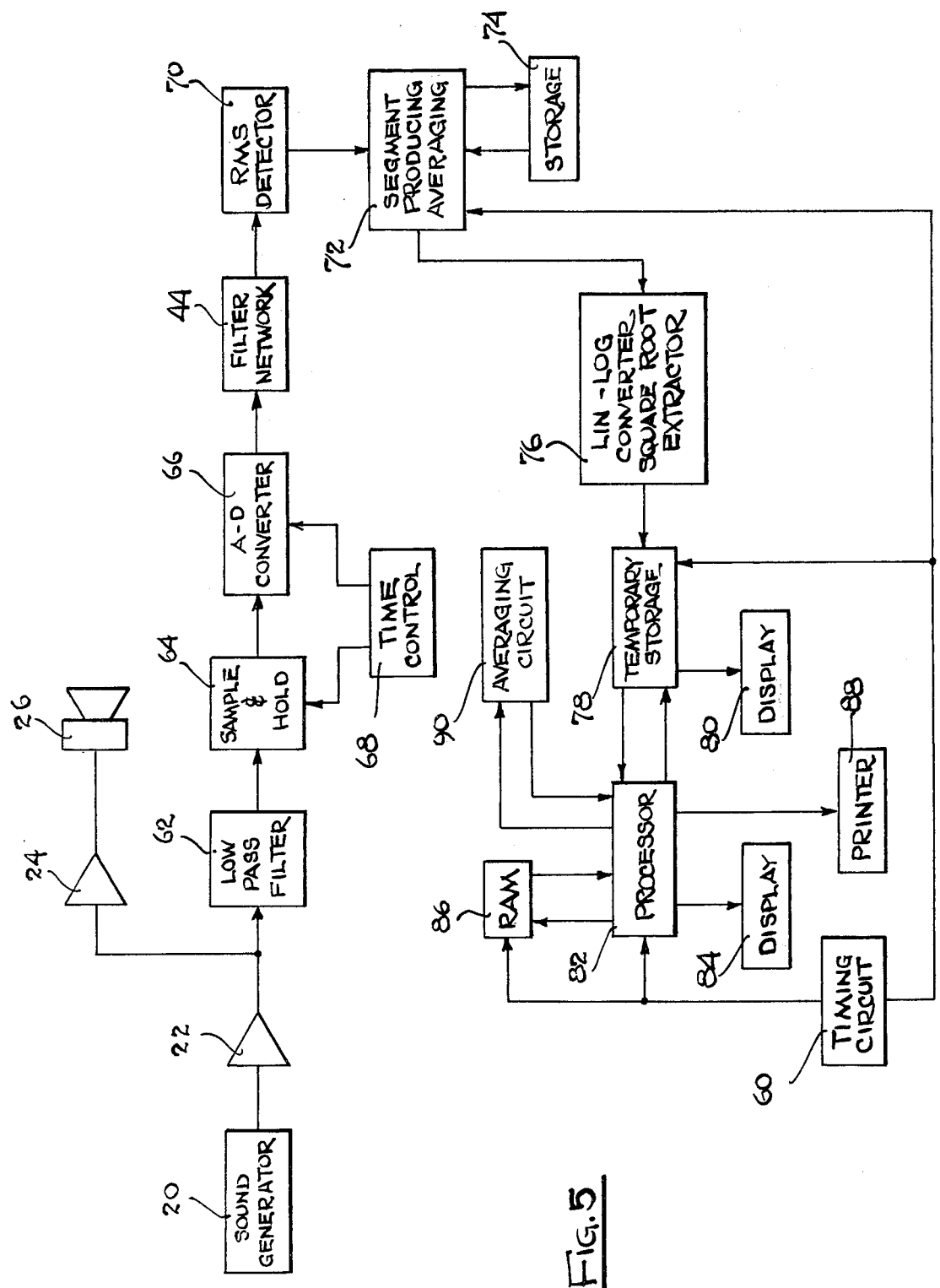
Figure 6:
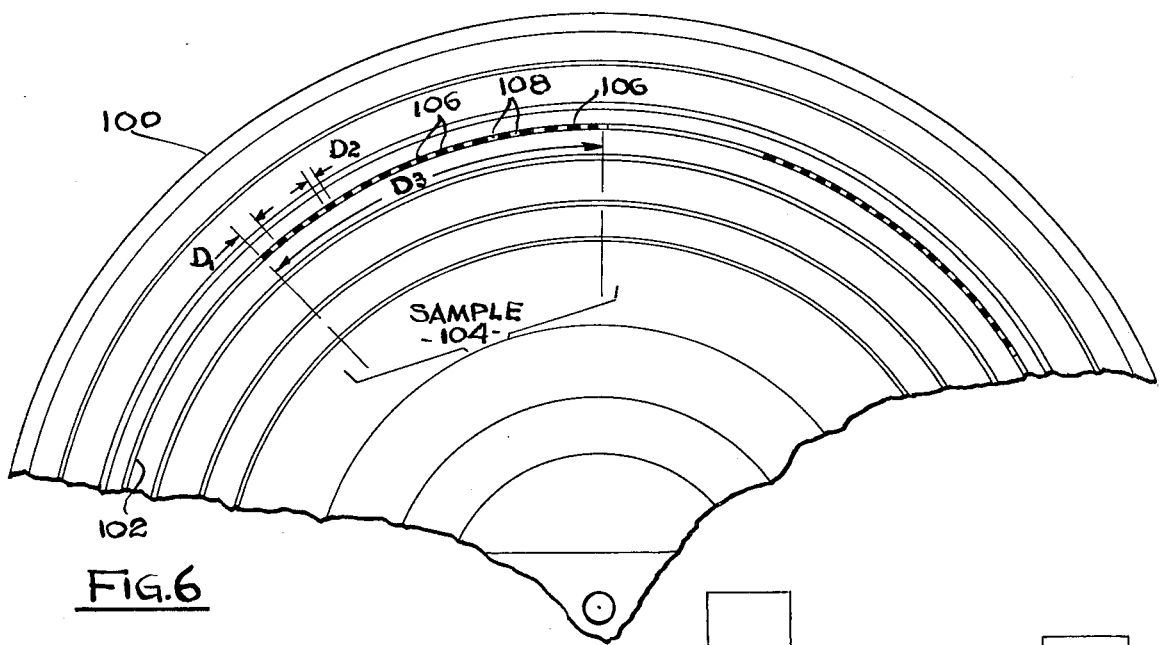
Figure 7:
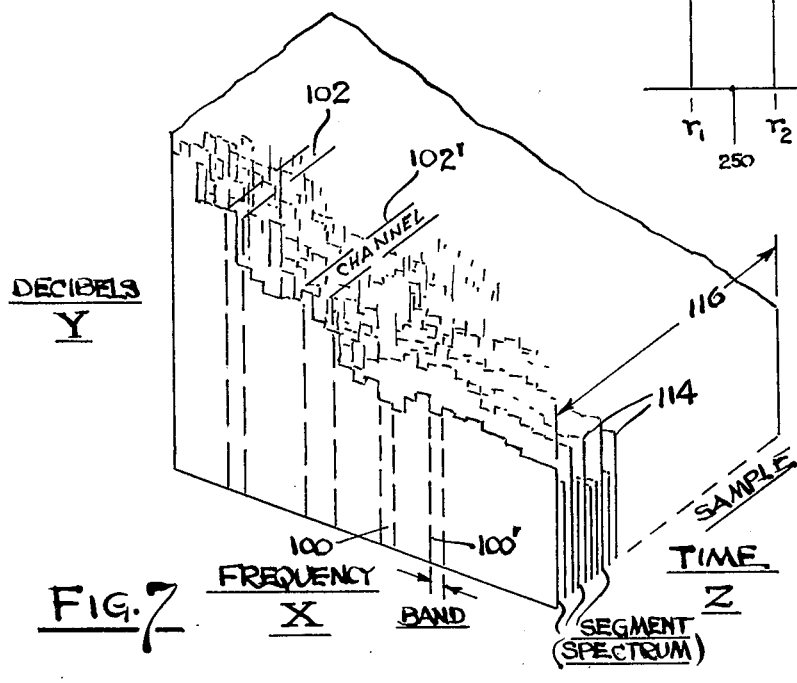
Figures 8, 10:
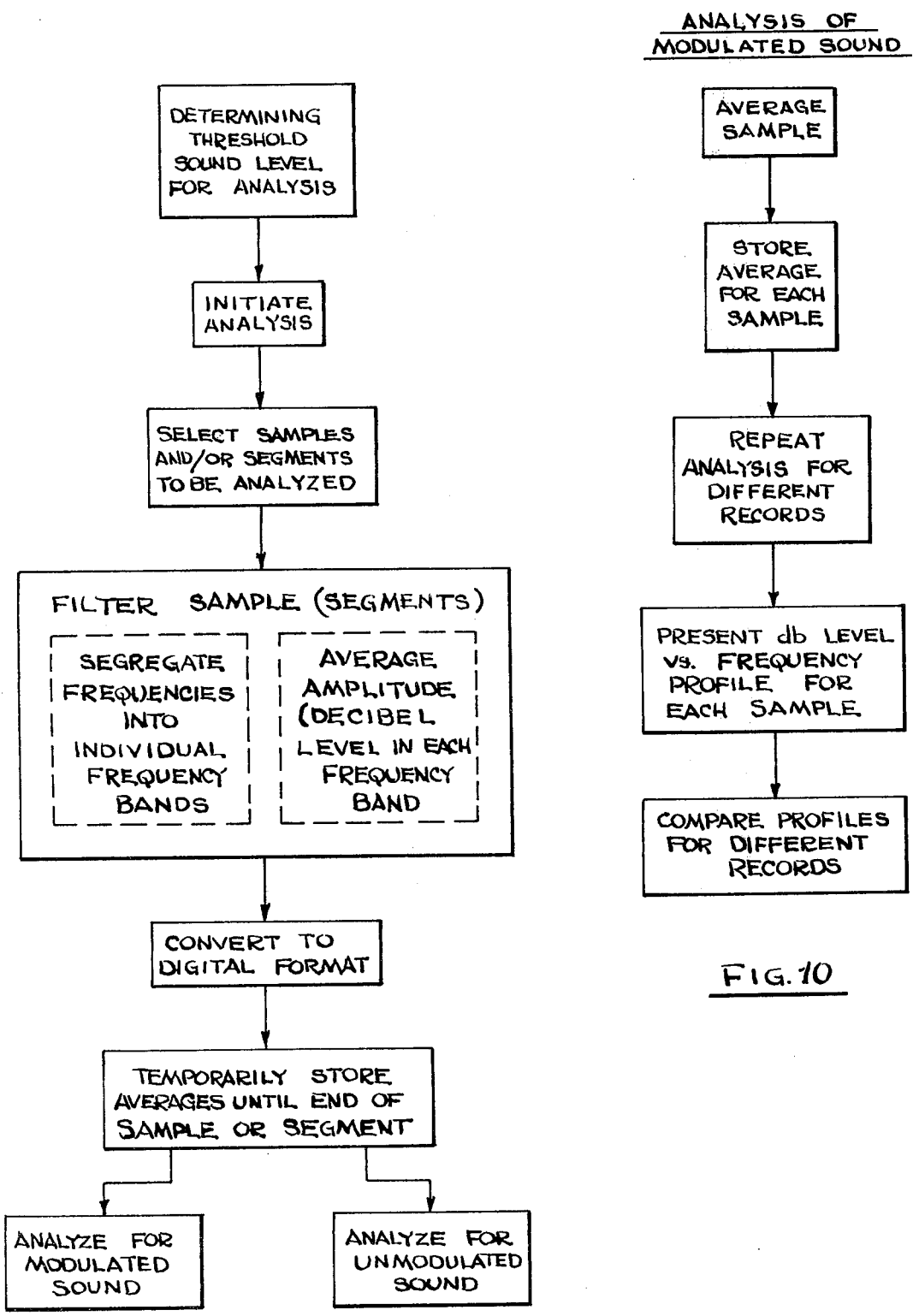

Having thus described the invention in general terms reference will now be made to the accompanying drawings (eleven sheets) in which:

FIG. 1 is a schematic block diagram illustrating certain components in a broad schematic sense which may form part of the apparatus and may be used to perform the method of the present invention;

FIG. 2 is a more detailed block diagram of one embodiment of an apparatus forming part of the present invention;

FIG. 3 is a partial detailed block diagram of another embodiment of an apparatus forming part of the present invention;

FIG. 4 is a detailed block diagram of a further embodiment of an apparatus forming part of the present invention;

FIG. 5 is a detailed block diagram of still another embodiment of an apparatus forming part of the present invention;

FIG. 6 is a fragmentary schematic top plan view of a record disc showing samples and segments thereof on the disc to be measured;

FIG. 7 is a schematic three-dimensional graph of a total spectrum content of a full sample with individual frequencies of each of the spectra plotted as a function of decibel levels;

FIG. 8 is a flow diagram illustrating the sequence of steps which may be used to practice the method of the present invention.

Figure 21:
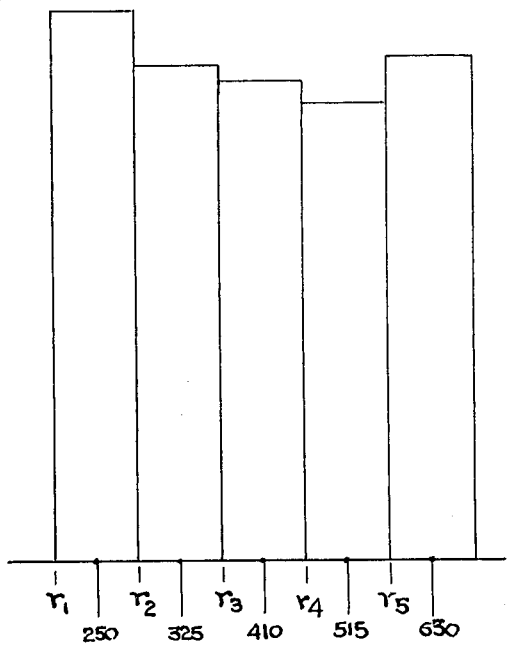
Figure 12:
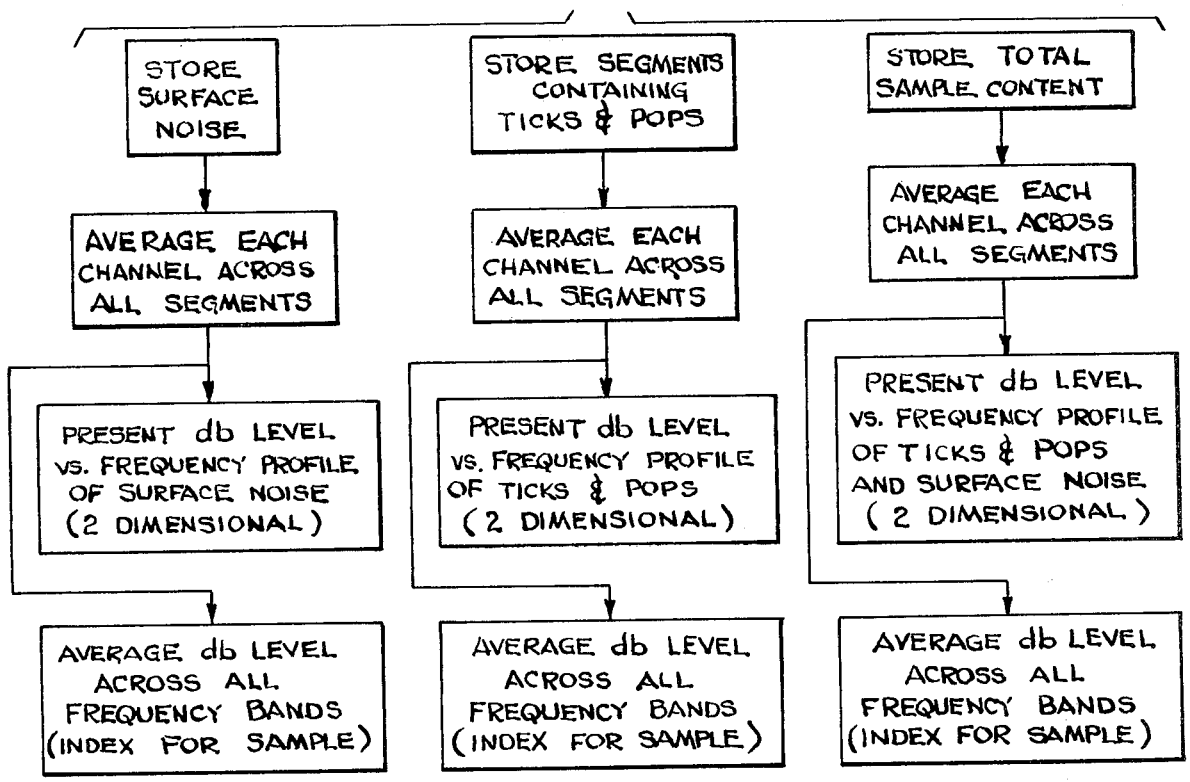
Figure 13:
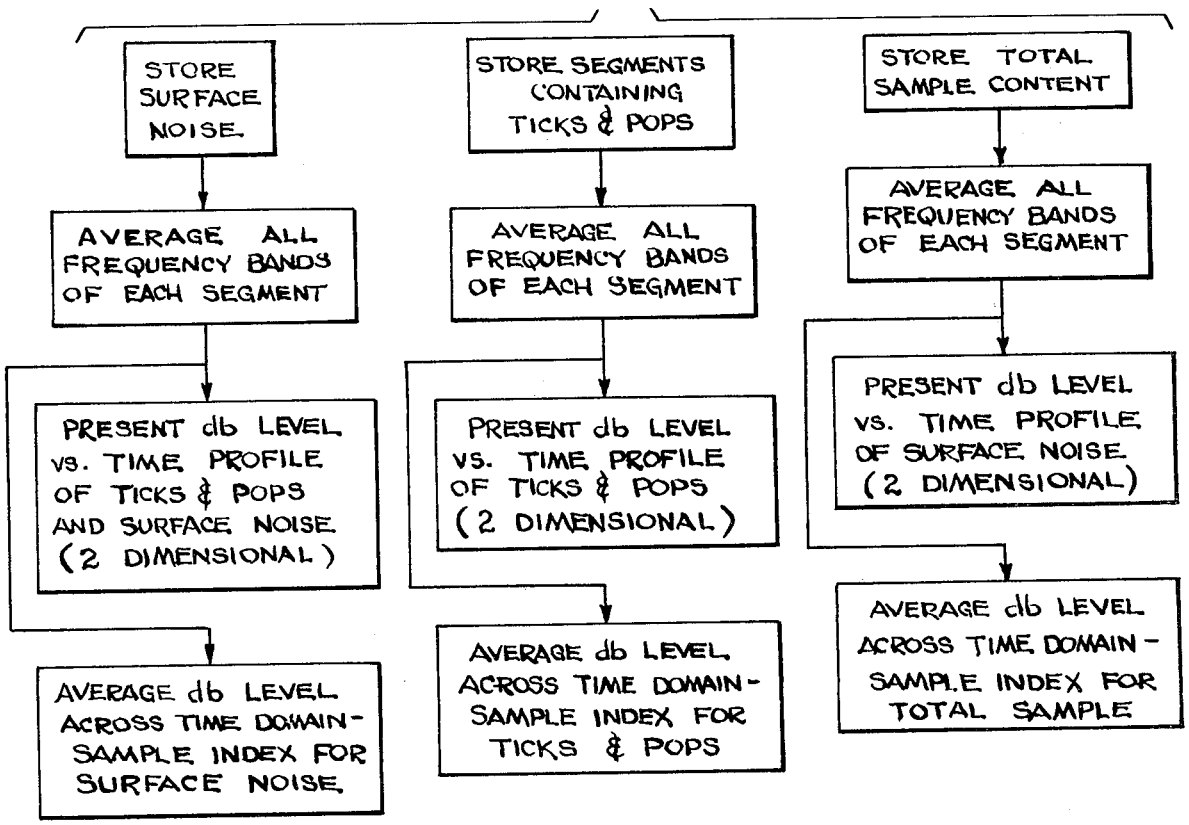
Figure 20:
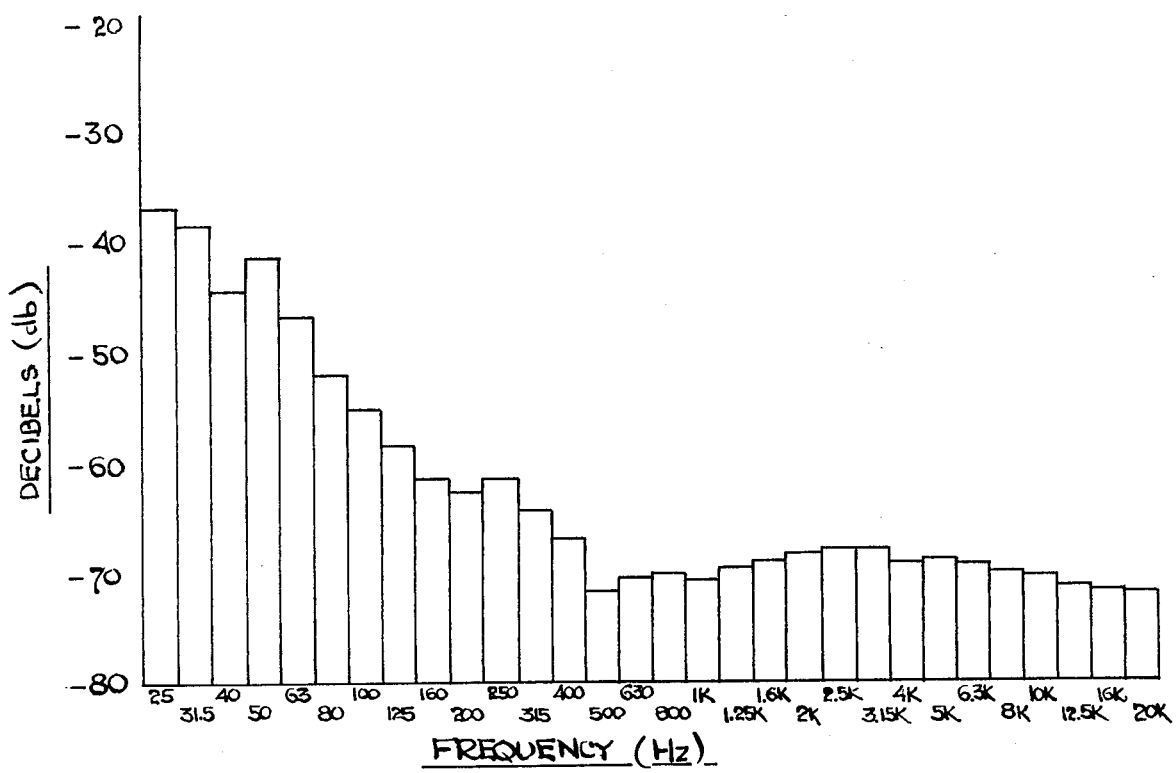
Figure 15:
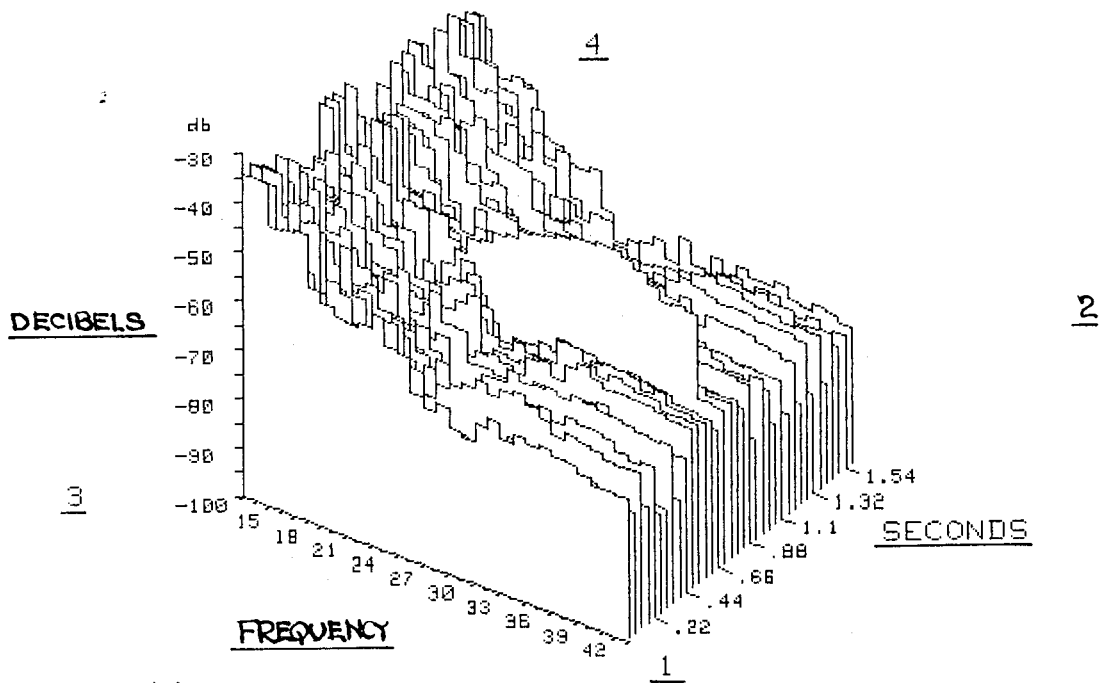
Figure 16:
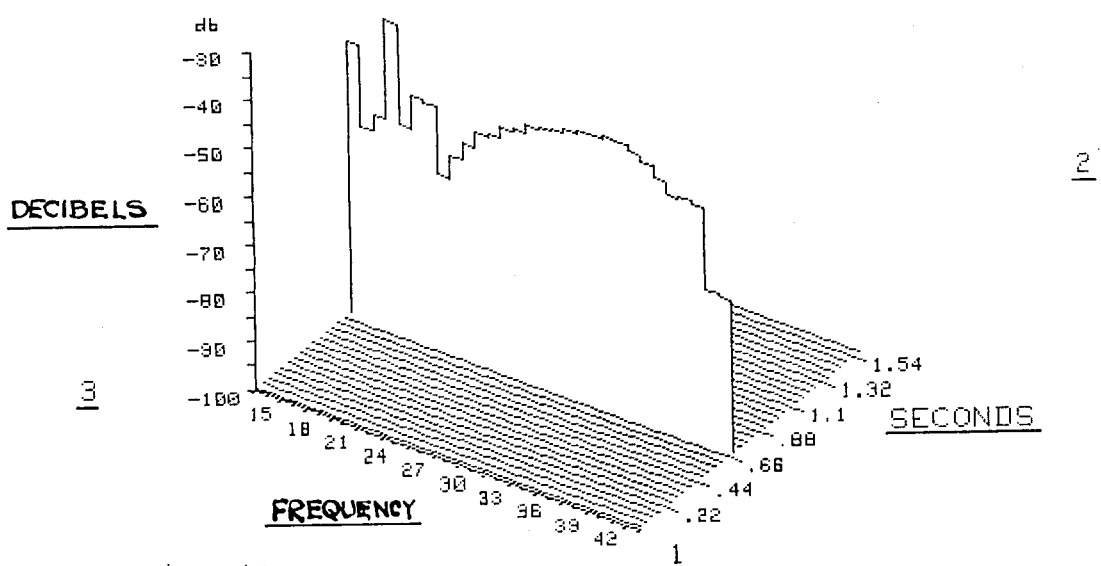
Figure 17:
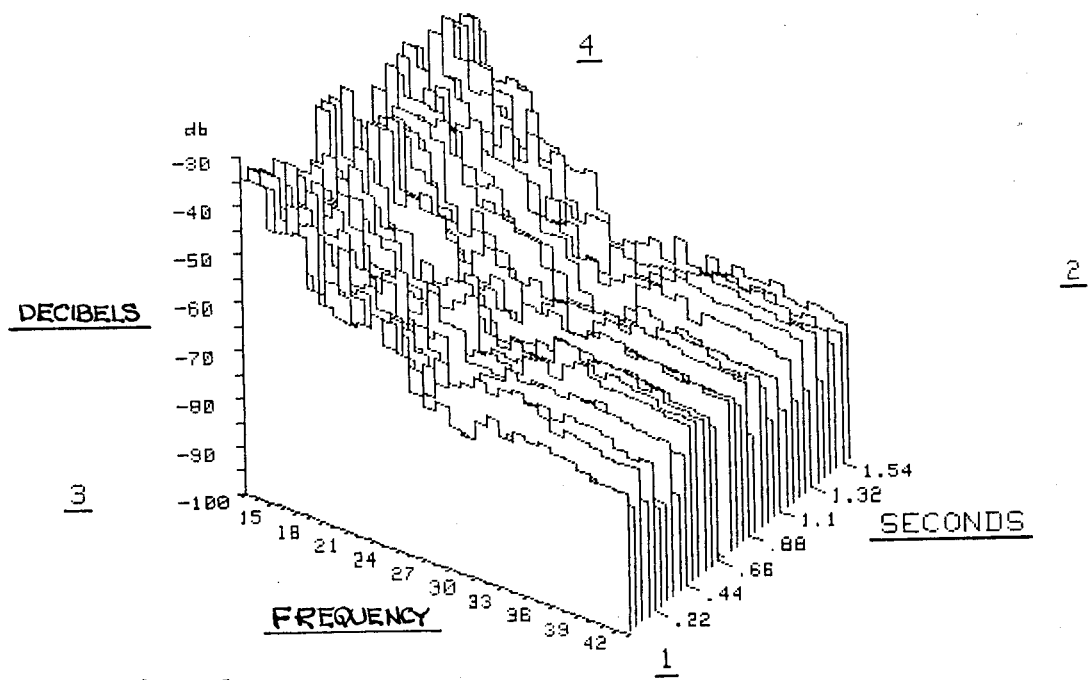
Figure 18:
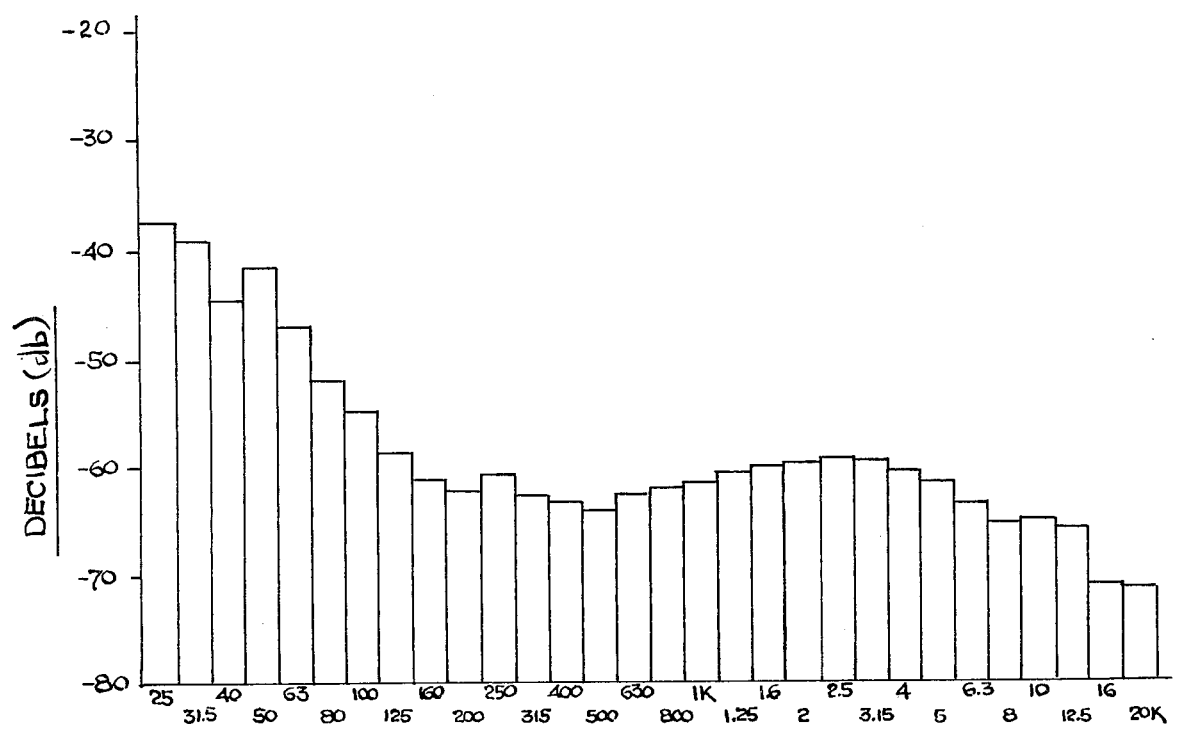
Figure 19:
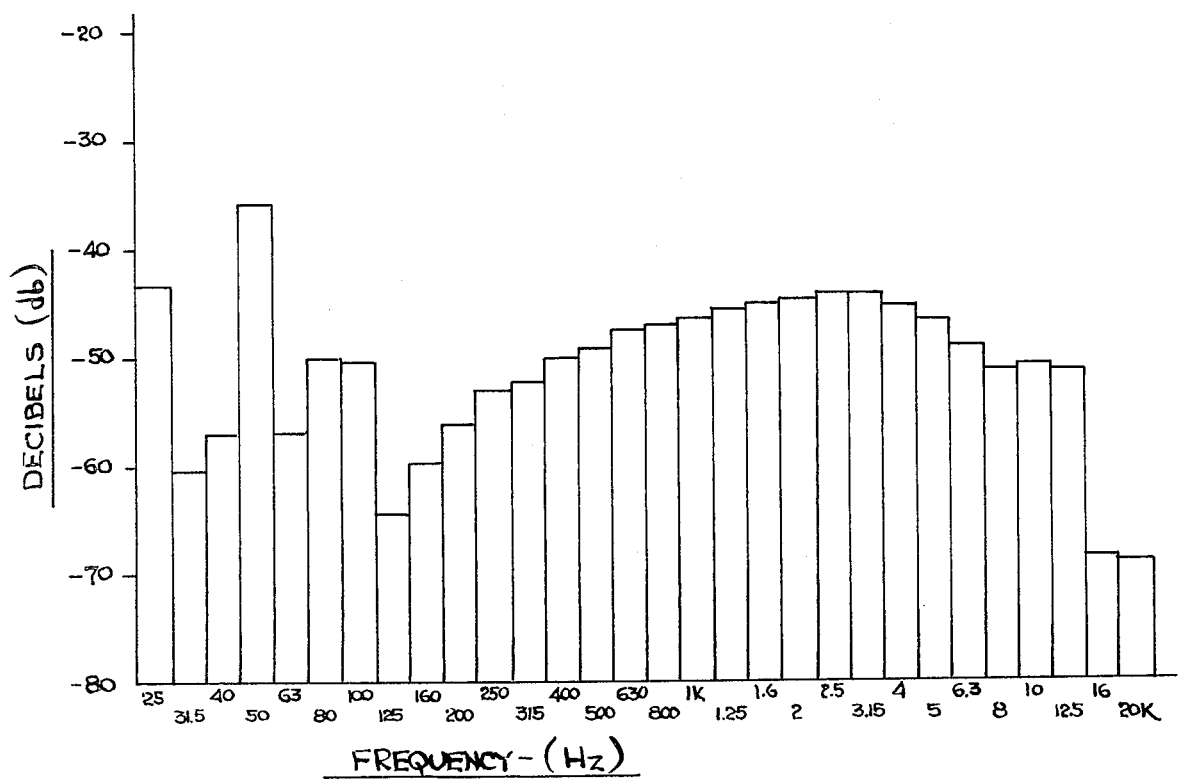

FIG. 9 is a flow diagram illustrating the sequence of steps which may be used to practice another embodiment of the method of the present invention;

FIG. 10 is a flow diagram illustrating the method steps used to measure and analyze modulated sound;

FIG. 11 is a flow diagram illustrating the sequence of steps used to measure and analyze unmodulated sound in accordance with the present invention;

FIG. 12 is a flow diagram illustrating the sequence of additional steps which may be used to measure and analyze unmodulated sound in accordance with the present invention;

FIG. 13 is a flow diagram illustrating the sequence of still further steps which may be used to measure and analyze unmodulated sound in accordance with the present invention;

FIG. 14 is a flow diagram illustrating the method steps used to identify ticks and pops in the measure and analysis of unmodulated sound;

FIG. 15 is a three-dimensional graph, showing all of the individual spectra in a sample with decibel levels as a function of frequency over the time domain of the sample;

FIG. 16 is a three-dimensional graph similar to FIG. 15 showing only the spectrum containing ticks and pops in the spectrum of FIG. 15 with the decibel levels as a function of frequency for the specific time interval of that spectrum;

FIG. 17 is a three-dimensional graph of the spectrum of FIG. 15 showing only the spectrum containing surface noise in the spectrum of FIG. 15, and which does not contain ticks and pops, and with the decibel level as a function of frequency over the selected time domain;

FIG. 18 is a two-dimensional graph showing an example of the average of a total spectrum containing surface noise and ticks and pops with an average of decibel level plotted as a function of frequency;

FIG. 19 is a graph of the spectrum of FIG. 18 showing only the ticks and pops in the spectrum of FIG. 18 with the average of decibel levels as a function of frequency;

FIG. 20 is a graph of the spectrum of FIG. 18 showing only the average surface noise included in the spectrum of FIG. 18 with the average of decibel level as a function of frequency; and FIG. 21 is an enlarged section of a portion of the graph of FIG. 18.

DETAILED DESCRIPTION OF A PREFERRED EMBODIMENT

Referring now in more detail and by reference characters to the drawings which illustrate a practical embodiment of the present invention, FIG. 1 illustrates certain basic components which can be used in connection with the present invention in order to measure and analyze sound. In the broad schematic outline of FIG. 1, a sound generator 20 is provided to generate a waveform signal from a phongraphic-type record disc which is being tested. This sound generator may adopt the form of a typical record turntable of conventional construction which is used to generate the sound.

The signal from the sound generator 20, which functions as a sound input, is introduced into a pre-amplifier 22 and boosted for an amplifier 24 and the signal of the amplifier 24 is, in turn, introduced into one or more speakers 26. In this case, the sound generator, such as the turntable, the pre-amplifier, as well as the speakers form part of a conventional audio fidelity music system. It is not necessary to generate the audible sound along with the measurement and analysis in accordance with the method and apparatus of the present invention and thus, the amplifier 24 and speakers 26 could be eliminated if desired.

Connected to the output of the pre-amplifier 22 is a frequency analyzer 28 and a processor 30. The frequency analyzer outputs digital representations of decibel levels for certain frequency ranges or bands. The processor 30, which may adopt many forms, is designed to sort the data into various forms, and operates in connection with the frequency analyzer 28. The term "processor" is only broadly used to indicate that certain of the data from the analyzer is being processed. The output of the processor 30 is introduced into a printer 32 which may provide a visual record of the information obtained. A plotter may be used in place of the printer and thus the term "printer" is used in a generic sense to include all forms of devices for reproducing hard copy. The hard copy, no matter how produced may be referred to as a "printed record". This printed record, which may contain the quantitative measurements, can be used to aid in the analysis of the record discs.

As indicated previously, the term "processor" is used only broadly to indicate that a signal is being processed. In the same respect, the term "frequency analyzer" is also used in a broad sense. Each of these components is only schematically representative of several components which actualy form part of the apparatus of the present invention and which are more fully illustrated in FIG. 2 of the drawings.

Prior to the discussion of the apparatus and method of analysis, in more detail, a brief description of various ways in which signals are generated and processed is desirable. Samples of record discs are taken and measured in analysis of both modulated and unmodulated sound.

Each sample may be divided into one or more component parts or segments for purposes of measurement and averaging. In the case of the measurement and analysis of modulated sound, generally only one sample segment is used, that is, the sample is continuous and may last for several seconds without interruption in the measuring process. In the case of measurement and analysis of unmodulated sound, the sample is divided into a plurality of individual sample segments and these segments actually represent time signals, as hereinafter described.

FIG. 6 illustrates a portion of a record disc 100 from which sound can be measured and analyzed. The record disc 100 contains sound producing grooves 102 (which have been enlarged in FIG. 6 for purpose of illustration) from which the modulated sounds are generated. These grooves may also contain cross-over regions from the end of one modulated sound recording to the beginning of the next modulated sound recording. In the schematic illustration of FIG. 6, it can be observed that there is one sample which is being taken and which is represented by reference numeral 104. Further, the sample 104 is subdivided into a plurality of sample segments 106 and each two segments 106 being separated by a quiescent period or non-sampling period 108 within the entire sample. In the analysis of unmodulated sound, measurements are made in cross-over regions, between two modulated signals, or lead-in regions, before modulated signals, or lead-out regions, after modulated signals.

In a preferred embodiment, a sample is measured by measuring a first sample segment for approximately thirty-one and one-fourth milliseconds, waiting for a discrete period of time, e.g., twelve and three-fourths milliseconds and then measuring a second sample segment for approximately thirty-one and one-fourth milliseconds. This process continues until a desired number of sample segments, preferably thirty-six samples segments in each sample, have been measured. Thus, the entire sample has a time frame of about 1584 milliseconds or 1.584 seconds, in a preferred embodiment.

In FIG. 6, the distance $D_1$ is actually a representation of the time for measuring one sample segment and the associated cap or non-sampling period for that segment, which in the referred embodiment is forty-four milliseconds as aforesaid. Also, in FIG. 6, the distance $D_2$ is actually a representation of time for measuring only one sample segment and on the associated non-sampling period, which in the aforesaid preferred embodiment is thirty-one and one-fourth milliseconds as aforesaid. The total sample time is represented by $D_3$, which in the preferred embodiment is 1.584 millisceonds.

This subdividing of the sample into sample segments is preferably done with the analysis of unmodulated sound. However, it should be understood that a sample could be subdivided into a plurality of sample segments in the analysis of modulated sound as well and initially processed in the same way as the sample segments in unmodulated sound.

FIG. 7 is a schematic representation which more fully illustrates the plotting of each of the thirty-six sample segments, or other number of sample segments in a sample, with each sample segment being plotted in terms of the frequency band as a function of decibel level. Thus, each sample segment is a plot, in a specific time frame interval of the entire sample of a measured frequency band and the decibel levels for each of the frequency bands in the sample segment. These individual frequency bands are hereinafter described in more detail.

By reference to FIG. 7 it can be observed that each sample segment occurs over a specific period of time, namely a certain time interval. However, inasmuch as that time interval is relatively short, considering the entire time frame of the full sample of thirty-six sample segments, any one particular sample segment can be plotted as though it were instanteously measured in a fixed instance of-time. Thus, by reference to FIG. 7, it can be observed that each of the individual sample segments are plotted as though they were each measured in a fixed instance of time.

Each sample segment actually represents all or many of the frequencies which arise and the decibel levels at these frequencies during the time increment for that sample segment. These frequencies, for example, may include all frequencies from the uppermost of the frequencies to the lowermost of the frequencies in the sample segment. Thus, each sample segment actually represents a sound spectrum. Accordingly, each of the sample segments, as schematically illustrated in FIG. 7 and as illustrated in FIGS. 15-17, as hereinafter described, may be referred to as a frequency spectrum.

Each of the frequency spectrums includes a large number of frequencies ranging from the very highest to the lowest, as mentioned above. In analyzing and plotting the frequencies in each spectrum a selected band is taken and plotted and another selected band is taken and plotted and so forth until all frequencies in the spectrum are accounted for.

The frequencies in each of the spectrums are grouped together in a plurality of selected bands. Thus, a first group of frequencies are banded together to form a first band, a second group is banded together into a second band and so on until all such frequencies in the spectrum have been included in a frequency band. Thus, all of the spectrums are comprised of a plurality of frequency bands which account for all of the frequencies in the spectrum. At least two such individual frequently bands are shown in the first samples segment of FIG. 7 and are identified by reference numerals 110 and 110'.

Each frequency band is actually represented by a midband frequency or center frequency of all frequencies in that band. Further, that center frequency actually is the representation of a frequency for an average decibel level of all of the frequencies in that band. Thus, for example, reference is directed to FIG. 18, which illustrates in X-Y format, onr particular spectrum with the frequencies plotted as a function of decibel level. An enlarged fragment of that spectrum is illustrated in FIG. 21, in order to enable a greater appreciation of the identification of each of these frequency bands.

Considering the five bands having center frequencies of 250 $H_z$ to 630 $H_z$, these five bands are specific ranges of frequencies represented by their center frequencies of 250, 325, 410, 515 and 630 $H_z$, respectively. The first of these frequency bands is represented by a center frequency of 250 $H_z$ and is the mid frequency of all frequencies in the range of $r_1$ to $r_2$. The second of these bands, having a center frequency of 325 $H_z$, actually represents a mid frequency of frequencies of about $r_2$ $H_z$ to about $r_3$ $H_z$. The third of these bands, having a center frequency of 400 $H_z$, actually represents a mid frequency of frequencies of about $r_3$ $H_z$ to about $r_4$ $H_z$ and so forth, as illustrated and hereinafter described in more detail.

Each of the specified bands have the same frequency range in all of the sample spectrums, and all bands of the same frequency ranges when considered together, are referred to as a channel. Thus, for example, by reference to FIG. 7 it can be observed that all bands in the entire sample having the same frequency range constitutes a channel, designated by reference numeral 102. A second channel 102' transversing all of the sample spectrums is also shown in FIG. 7. Thus, each channel extends across all segments in the Z dimension constitutes a common frequency band for each segment, as for example, a 325 $H_z$ band. These channels are also used for averaging or obtaining another statistical measure, as hereinafter described in more detail.

Each of the sample segments of a complete sample are schematically illustrated in FIG. 7. Each sample segment is represented by reference numeral 114. The time required to measure all sample segments of a sample constitutes the time domain for a sample. Thus, one complete sample comprises thirty-six sample segments 114 and when the completed sample is representd, in a time domain along the Z axis of FIG. 7, by reference numeral 116. This time domain 116 is equivalent to the time to measure the sample $D_3$ in FIG. 6.

It typically is desirable to generate signals which plot a composite of all spectrums or sample segments in a particular sample to thereby render a three-dimensional plot. Thereafter, any one spectrum in a sample can be selected and regenerated and plotted or displayed in a two-dimensional plot for the purpose of more fully analyzing that particular spectrum. However, as indicated above, by slightly revising the hereinafter described circuitry, it is possible to generate signals for each spectrum individually and plot each spectrum and thereafter combine all such signals such that all spectrums in a sample are combined and presented as a composite.

In order to make a comparison of one spectrum with another spectrum in the same sample, or with a spectrum in a different sample for that matter, it is possible to average the entire angle across all frequency bands therein to produce a single index number representing an average of decibel levels. Thus, it is possible to compare one spectrum to another by mere comparison of index numbers.

In another embodiment of the invention, it is possible to generate index numbers for each spectrum in a sample and thereafter average the index numbers for each spectrum in a sample to arrive at a single index number for the entire sample. In this way, it is possible to compare one sample with another sample, whether or not from the same record disc, in order to make comparison. Thus, entire sample s, with each comprised of a plurality of sample segments, may be compared with one another by mrere comparison of the sample index numbers.

In a more preferred expect of the present invention, each of the sample segments are plotted in a composite, as schematically illustrated in FIG. 7. In order to more fully analyze the effect on the total sound contributed by any band in all of the sample spectrums, the median for the same band in each of the spectrums is obtained. While an average of the decibel levels for each of the same bands of all of the spectrum could be obtained, it is preferrable to obtain the median value due to the fact that the distribution of sound level is not normal.

After averaging of taking another statistical measure of each channel, that statistical measure can be reduced to an index number which may represent an average or other statistical measure of decibel levels for that channel. Therefore, all channels can be averaged so that the one index number can be obtained to represent the entire sample. In this way samples can be compared merely by comparison of the index numbers.

Each frequency band in each sample segment is comprised of the same frequency ranges, and a band of this frequency range extending across all spectrums is a channel, as aforesaid. In other words, a band in any one segment of a channel has the same frequency range as the same band in any other spectrum, although the decibel level average for one band in a spectrum may differ and will probably differ from the decibel level average for the same band in another spectrum. This is particularly true since the decibel level averaging process which takes place is by means of the filters which are used.

In the filtering process the decibel levels in each band are actually averaged and not the frequencies for that band. The averaging of the decibel levels for each band in a sample spectrum is not a true averaging process in the sense that all frequencies in that band are averaged in a mathematical context. Rather, the averaging of the decibel level for any band occurs through the use of the selected filters which filter out the band of frequencies. However, it has been found in connection with the present invention that the averages of decibel level in each band of each spectrum very closely approximates those which would be obtained by mathematical processing.

It should be understood in connection with the present invention that two different types of averaging processes takes place. First of all, during the banding groups of frequencies into individual bands, the decibel levels of the various frequencies in that band are averaged by the filtering process, as described above. In the second averaging process, an averaging circuit is provided for averaging decibel levels of various frequency bands, either in the same spectrum or across all of the spectrums.

Referring now to FIG. 2 which illustrates in greater detail those components suitable for use in connection with the practice of the method and which form part of the apparatus of the present invention, it can be observed that a level detector 38 or so-called "thresold detector", is connected to the output of the preamplifier 22. The level detector actually functions as a threshold detector and may be adjusted to initiate the analysis when the sound level exceeds a certain predetermined value. In another embodiment of the invention, the threshold level is adjusted so that the theshold detector will commence analysis when the noise level falls below a predetermined value. In either case, it is possible to program the processor with the threshold levels to cause commencement of the analysis when the threshold level is reached.

When measuring and analyzing modulated sound, the level detector 38 is used to initiate the measurement activities and the subsequent analysis when the threshold level has reached and then exceeds at least a certain minimum value. When measuring unmodulated sound, the threshold detector 38 is adjusted so that the measurement and analysis will be initiated when the decibel level falls below a certain threshold level. These threshold levels can be easily established depending upon the level of the modulated sound and upon the type of unmodulated sound inherent in the record disc itself. Threshold level detection can be made by a processor forming part of the circuit as hereinafter described in more detail; in which case the level detector 38 can be eliminated.

A filter network 44 is connected to and receives the output of the level detector 38. The filter network 44 may be comprised of a plurality of filters with each selected so as to separate the signal into a plurality of signals in various frequency bands. The filter network, which is often referred to as a "filter" operates on a one-third ($\frac{1}{3}$) octave band. The one-third octave band is used to divide the audible sound spectrum into a plurality of individual bands, which in the preferred embodiment is forty-two individual one-third octave bands with each of these bands representing a range of frequencies. Only the most prominent thirty bands for each sample or sample segment is illustrated in the accompanying drawings for purposes of clarity. Thus, the incoming signal is separated into its component frequencies by this filter network 44.

The plurality of signals (each representing a particular frequency band) are temporarily stored in a temporary sample storage 46 until the end of that sample, that is, until all component frequencies in the sample have been measured. As described in more detail below, in connection with the embodiment for analyzing unmodulated sound, the temporary sample storage 46 will store the signals for each sample segment until the entire sample segment has been measured.

An analog-digital converter 48, often referred to as an "A-D converter", is interposed between the sample storage 46 and the filter network 44, converts the output to digital format, at least for purposes of storage, and this information is stored in the temporary sample storage 46 at the end of each sample segment which is being analyzed. The next segment forming part of that same sample is then stored in the temporary sample storage. Thus, while one segment of a sample is being analyzed, the previous segment is temporarily held in sample storage 46. This process continues until all of the various segments in a particular sample have been filtered. During the processing of the entire sample, all data is introduced into the analog-ditigal converter 48 to convert the signals into their digital equivalents for storage and also for further processing, as hereinafter described in more detail.

An averaging circuit 50 is connected to an output of the processor 30 and provides an input of averaged signals to the processor 30. The averaging circuit 50 is designed to provide several averages depending on the instructions from the processor 30. In one embodiment, the averaging circuit 50 averages the decibel level of each segment which was initially introduced into the sample storage 46 and transferred to the averaging circuit 50 through the processor 30. In other words, the decibel level for each frequency band of each of the segments in the sample is averaged. The average of the decibel levels for each of the segments may be plotted, if desired, to obtain a plot of decibel levels for the time domain of the sample. The output of the averaging circuit could be an averaged decibel level over the duration of the entire sample in measuring modulated sound, or as previously explained, an average of decibel level for each segment in the sample in measuring unmodulated sound.

As indicated previously, averaging or other statistical measure can be made across channels so that all like bands of a sample, e.g., a channel can be averaged with successive channels being averaged. In this case, the output of the averaging circuit 50 will be an average of decibel level as a function of frequency.

The averaging circuit 50 can also provide an identification of the frequency band associated with each averaged amplitude output and an identification of the sample. In the case of the unmodulated sound analysis, this identification may include an identification of the spectrum with which the averages are associated.

The processor 30 receives an output of the averaging circuit as aforesaid. This output may include a first output signal containing a sample segment identification, and a second output signal containing the decibel level average band for each such segment. The processor 30 also operates in conjunction with a random-access-memory 54 (RAM) and a read-only-memory 56 (ROM) to operate on the data and place it in a proper format for use in a display member 58 or in a form for printing by means of the printer 32.

The printer 32 my adopt any conventional form of printer which may be connected to the output of the processor 30. Typical interfacting circuitry may be employed if desired. In like manner, the display may adopt any form of display capable of receiving an output from the processor 30. In this case, the display may adopt the form of a plurality of so-called "Nixi-tubes" or cold-cathode tubes, or otherwise it may adopt the form of a matrix of light-emitting diodes, or the like.

The apparatus also includes a timing circuit 60 which has outputs connected to many of the major components forming part of the apparatus as for example, the processor 30, the random-access-memory 54, the averaging circuit 50 and the sample storage 46. The timing circuit 60 is designed to cause each of the components to operate in a time coordinated manner in order to perform the analysis as hereinafter described in more detail.

By further reference to FIG. 2, it can be observed that the random-access-memory receives inputs from the processor 30 and the averaging circuit 50 and has outputs directed to these two components. In like manner, the processor 30 receives an input from the timing circuit 60 and also has an output to the timing circuit 60.

The read-only-memory 56 is more specifically designed to control certain of the basic operations, and also to serve as a storage of the information which is to be displayed or printed or further processed. The random-access-memory 54 is more specifically designed to control the sequence of operations in order to perform the method of the present invention. For this reason, the random-access-memory has inputs and outputs to the averaging circuit and the processor and in the like manner, the processor and timing circuits each have inputs and outputs relative to one another. Thus, the processor effectively initiates the sampling by initiating request to the timing circuit to initiate a command to the random-access-memory 54. In this way, the averaging circuit will accept another sample from the temporary sample storage 46, perform the averaging and transfer that information to the processor 30 for storage in the ROM 56 or for further display or print-out.

FIG. 3 is a partial schematic block diagram illustrating a modified form of apparatus which may be used in accordance with the present invention. In this embodiment of FIG. 3, the level detector 38 also receives an amplified input from the sound generator 20 (not shown in FIG. 3). The level detector 38 has an output directly to the analog-digital converter 48 which, in turn, converts the analog signal to a digital signal for ultimate transfer to a filter network 44. In this embodiment, it can be observed that the analog-to-digital converter 48 preceeds the filter network 44. Thus, the output of the filter network 44 is introduced into the sample storage 46 which, in turn, has its outputs introduced directly to the processor 30.

In this embodiment of the invention, illustrated in FIG. 3, the analog-to-digital converter 48 converts the signals into a digital format where they can be filtered by the filter network 44 in the digital format. Thus, for this embodiment of the invention, a digital filter network would be employed.

FIG. 4 is a schematic block diagram of still another modified form of apparatus which may be used in accordance with the present invention. In the embodiment of the invention in FIG. 4, the output of the sound generator 20 is introduced through the pre-amplifier 22 and directly into the filter network 44. A power amplifier 24 and speaker 26 may also be connected to the output of the pre-amplifier 22 in the manner as illustrated.

The output of the filter network 44 is introduced directly into the analog-digital converter 48 for conversion to a digital format. The output of the converter 48 is introduced into temporary sample storage 46. Conversion to digital format should be accomplished prior to temporary storage. As indicated previously, the filter network 44 provides a plurality of bands of frequencies for a sample, or for each segment of a sample. The signals from the filter network representing the individual frequency bands, actually represents a decibel level for each of the frequency bands as well. In any event, this information which is temporarily stored in the sample storage 46 is introduced directly into the processor 30.

In this embodiment of the invention, there is no discrete level detector. The processor is programmed so that it can determine whether or not the sample or the sample segment which has been analyzed has reached a desired threshold level. If indeed the sample has reached the desired threshold level, it may be saved and stored in the read-only-memory 56. Further, the processor 30 will cause the information to be averaged and initiate another sampling signal, whereby another sample or sample segment may be averaged. The gap or non-sampling period between each of the sample segments allows the processor 30 to determine whether or not that segment has reached the desired threshold level and to thereby cause random-access-memory 54 to initiate another averaging signal for operation of the averaging circuit 50.

In this embodiment of the invention, each of the sample segments are continuously analyzed, although they may not be stored for further use. The information from the sample segments are only stored when the processor 30 has determined if the sample segments have crossed over the desired threshold level. A display 58', similar to the previously described display 58, may also be connected to the output of the temporary storage 46. In this case, the display 58' will constantly generate a display of the information at the output of the temporary sample storage 46, whether or not that information is to be stored and used.

The processor 30 also has the display 58 connected thereto along with the printer 32 connected thereto. Thus, when the processor has determined that the sample exceeds the desired threshold level, that information is stored as aforesaid, it may be averaged as desired and then displayed on the display member 58 and may also be provided in the form of a printed copy from the printer 32.

It can be observed that the apparatus of FIG. 4 also includes a timing circuit 60 which provides timing signals to essentially the same components in the manner as illustrated in FIG. 2. Beyond this, the circuit of FIG. 4 is similar in operation and construction to the circuit of FIG. 2.

FIG. 5 is a schematic block diagram of still a further modified form of apparatus which may be used in accordance with the present invention. In this embodiment of the apparatus, a low pass filter 62 is connected to the output of the preamplifier 22 which also receives its input from the sound generator 20, in the manner as previously described. The low pass filter 62 is designed to remove frequencies higher than 27 kH$_z$.

The output of the low pass filter 62 is introduced into a sample and hold circuit 64 which has an output introduced into an analog-digital converter 66, similar to the previously described analog-digital converter 48. The analog-digital converter 66 and the sample and hold circuit 64 operate in conjunction with each other under the time control of a separate time control circuit 68, in the manner as illustrated in FIG. 5 of the drawings. The sample and hold circuit 64 is designed to chop the incoming signal at a high frequency of approximately ,66,667 kH$_z$.

The filter network 44, as in the previously described embodiment of the apparatus, receives the output from the analog-digital converter 66. The filter network 44 is designed to filter the signal into the various frequency bands, in the manner as previously described.

An output of the filter network is introduced into a root mean square detector 70, designated as "RMS detector" in FIG. 5. The root mean square detector 70 has an output introduced into a segment producing averaging circuit 72 which, in turn, is associated with a storage 74. It can be observed that the averaging circuit 72 has an output introduced into the storage 74 and receives an input from the storage 74. This storage 74 may adopt any conventional form of storage mechanisms such as a conventional solid state storage.

The storage 74 operates in conjunction with the filter network 44 and in conjunction with the segment producing averaging circuit 72. As indicated in the previous embodiment of the apparatus, a temporary storage is employed to temporarily hold portions which have been filtered until the entire sample or sample segment has been filtered. It should be understood that since a sample may be continuous and extend for several seconds, for that matter, it is necessary to temporarily store portions of a segment of sample being processed with all portions of the sample or sample segment have been filtered. This temporary storage is accomplished with the storage 74 connected to the segment producing averaging circuit 72.

As also indicated above, a sample may be divided into a plurality of segments and each segment may be considered to extend only for a discrete period of time as though it occurred in one fixed increment of time. However, in order to more accurately detect and analyze each segment as though it occured in a fixed increment of time, e.g., almost instantaneously, the segment averaging circuit 72 is provided. Due to the fact that the segment actually occurred over a specific period of time, the entire segment is averaged, i.e., in the Z directon, reference being made to FIG. 7. Thus, when any particular segment is displayed, it will be displayed as though it did in fact occur in a specific fixed increment of time.

The output of the segment producing averaging circuit 72 is introduced into a linear-logrithmic covnerter and square root extractor 76 which is of conventional construction (designated as "Lin-Log Converter Square Root Extractor" in FIG. 5). The converter-extractor 76 operates effectively in conjunction with the root mean square detector 70. Due to the fact that the decibel levels for each individual frequency band are not linear as such, it may be necessary to place the signals in a form where they can be averaged accurately. For this purpose, the root mean square detector 70 is employed. Thereafter, in order to convert the averaged signals back to the original form, the lin-log converter and square root extractor 76 is employed.

The converter-extractor 76 has an output introduced into a temporary storage 78. A display member 80, similar to the previously described displays 58, may be connected to the output of the temporary storage 78. In this way, the display 80 will display each segment after it has been averaged in the averaging circuit 72, that is, to produce the segment in a fixed increment of time. In other words, the viewer will observe another segment in the sample every 44 milliseconds on the display 80. In view of the fact that this rate of display is too fast for the user to acquire real information, a processor 82 similar to the previously described processor 30 is employed along with an associated display 84. In this case, it can be observed that the processor 82 receives an input from the temporary storage 78 and has an output directed to the temporary storage 78. The display 84 is also similar to the previously described displays 58. In addition, the processor 82 operates under the control of a random-access-memory 86. The processor 82 similarily has an output to a printer 88, similar to the previously described printer 32. Finally, a timing circuit 60 is employed and is connected to the segment producing averaging circuit 72, the temporary storage 78, the processor 82 and the random-access-memory 86.

The processor 82 has an input from and an output to another averaging circuit 90 which is designed to perform the averaging previously performed in the averaging circuit 60.Thus, after each segment is introduced into the processor 82, which may have its own internal storage, such as a read-only-memory as indicated above, these segments can be averaged in any manner with the averaging circuit 90. Thereafter, the information which is averaged may be displayed on the display 84 or printed by the printer 88.

It should be understood that the time control circuit 68 operates in conjunction with the timing circuit 60. In other words, samples will be initiated in timed relationship to the other operations taking place in the apparatus.

It should also be understood in connection with the present invention, that root mean square detector 70 and lin-log converter-square root extractor 76 may be used in the other embodiments of the apparatus in order to further facilitiate processing of the signals.

Referring to the flow diagram of FIG. 8, the sequence of steps undertaken to analyze sound may be more fully understood. It will be recalled that the starting point of the sample should be determined in order to facilitate the statistical comparison of different phonographic discs or in order to facilitiate similar repeated tests with the same record discs. In this respect, the same tests can be performed on a plurality of different record discs. In addition, a plurality of similar tests or the same tests can be repeated in the record disc in order to determine some statistical parameters about sound reproduction.

The threshold detector enables the determination of a starting location to enable statistically accurate comparison of individual tests. As mentioned above, the threshold level can be set manually to commence the analysis when the signal from the record surpasses a certain minimum level, as is the case for analyzing modulated sound. When set to a minimum level, the level is set high enough to ensure that surface noise will not start the analysis. Hence, only a modulated signal will be above the threshold level. On the other hand, the threshold level can be set to commence the analysis when the signal from the record falls below a certain maximum level, as is the case for analyzing unmodulated sound. When set to maximum level, the level is set low enough to ensure that no modulated sounds will start the analysis. Therefore, the first step in analyzing any phonographic disc is to determine the threshold sound level.

The analysis is initiated when sound of the appropriate level, i.e., low enough or high enough, is generated from the phonographic record. The sample selected for analysis is either a long sample or sample segment, for example a minute or longer, or a short segment, for example, less than thirty-two milliseconds. In any event, the signal comprising the sample or sample segment is divided into its component frequency bands. The decibel level for each band is determined and averaged. These averages are computed continuously while the sample is being taken. They are temporarily stored while they are being computed, and until the analysis of the complete sample or sample segment has been computed. Once the sample has been taken, and the averages determined, the analysis of the averages differs depending on whether modulated or unmodulated sound is under consideration.

By further reference to FIG. 8, it can be observed that the filter network actually serves two major functions, and for this reaons are shown in the same box. The first function is to segregate or filter a sample or segment into individual frequency bands. The second function is performed simultaneously and is the determination of decibel level for each of these frequency bands. In actuality, the filtering of the sample into individual bands and the determination of the average decibel level for each frequency band is accomplished essentially simultanesouly.

The filter network 44 actually filters the sample according to the frequency bands and actually determines the average decibel level for each of these frequency bands. Thus, two of the steps as illustrated in FIG. 8; that is (1) segregate frequencies into individual frequency bands; and (2) determine averages of decibel level for each frequency band can be accomplished by the filter network 44. In this way, the average of the entire sample can be obtained and temporarily stored in the sample storage 46.

The above described process of filtering and averaging can be viewed much in the same manner as a group of sieves being used to filter different sized particles of sand or similar particulate matter. Thus, for example, the first or uppermost of the sieves would be used to segregate out the largest particles of sand. The second uppermost sieve, e.g., immediately beneath the first uppermost sieve, would be used to segregate out the second largest sized particles of sand. The third or next succeeding sieve would segregate out the third largest sized particles of sand and so on, until each of the groups of particles have been filtered out according to the size of the sieve which is used. It can be observed that there is an averaging process which inherently takes place along with the filtering or segregation. The same process essentially holds true in connection with the filtering the ranges of frequencies into individual frequency bands and determining average decibel levels for each of these frequency bands, although in electrical equivalents.

After the sample or sample segment has been filtered in order to segregate the frequencies into individual frequency bands and to also determine an average of the decibel level of each frequency band, these signals are converted into a digital format for purposes of storage and further processing. Thereafter, each frequency band as it has been filtered in order to segregate ranges of frequencies into each band and determine an average of decibel level is temporarily stored until the end of such sample or sample segment. Thereafter, further processing of this information can be conducted in accordance with the analysis for modulated sound or the analysis for unmodulated sound, as hereinafter described in more detail.

The above described general description of the method of conducting an analysis of sound more specifically is accomplished in connection with the apparatus illustrated in FIG. 2 of the drawings. FIG. 9 of the drawings schematically illustrates steps in a modified form of method which can be used in making an analysis of sound from a record disc and which would typically arise in connection with an apparatus of the type illustrated in FIG. 5 of the drawings.

In accordance with the method as illustrated in FIG. 9, after the analysis has been initiated, the high frequencies which are not desired in the analysis are filtered out and this again may be filtered out by the low pass filter. Thereafter, the signals which have not been filtered out are converted to a digital format, as for example, by an analog-digital converter.

After the conversion to the digital format, the sample is filtered in the manner as previously described. However, in connection with the present invention, it should be understood that conversion to digital format could occur after the filtering process. In the latter embodiment, an analog filter would be employed whereas in the illustrated embodiment, a digital filter is employed. It should also be understood in connection with the filtering process that the average amplitude level in each frequency level in each frequency band is determined. The decibel level as such, is not actually determined in the filtering process due to the fact that the decibel level is a logarithmic function. Nevertheless, this amplitude can be converted through a mathematical process into the decibel level.

After the sample or sample segment has been filtered, the information is temporarily stored until the end of the sample or that segment. Here again, the information which is stored is actually a decibel level average of each such sample or sample segment.

In accordance with this embodiment of the method as illustrated in FIG. 9, an average of the segment interval time is taken. This may be more fully accomplished by use of the segment producing averaging circuit 72, as illustrated in FIG. 5. Thus, each segment time is averaged in order to produce a discrete interval of time for that segment. This information may be temporarily stored for each sample or segment and thereafter displayed.

Also in accordance with the method as illustrated in FIG. 9, all information which is generated, may be continuously displayed, whether or not it exceeds the sample threshold level for either modulated sound or unmodulated sound analysis. In addition, the method includes a determination of whether or not the sample or the segment of a sample did exceed the threshold level. Further, this determination can be conducted in the processor as previously described, or it may be conducted in a level detector.

In one embodiment of the invention, the method and apparatus can be used to determine which particular frequencies are not well reproduced by a given material. In this embodiment, a sample is taken from an area of the record for a period of time. The length of the sample is chosen to provide sufficient data to obtain a true identification of the reproduction of the pertinent frequencies, as for example, a three minute sample. As described above in greater detail, this sample is comprised of one sample segment and, thus, the decibel level for each frequency band is averaged over the entire sample. This is true in the analysis of modulated sound.

Referring now to FIG. 10, the remaining steps of the analysis, as applied to modulated sounds, are illustrated. The decibel level averages for the sample are further analyzed for obtaining an index number of decibel level. This decibel level index number may be stored for later use in making comparisons. For example, the read-only-memory 57, illustrated in FIGS. 2, 4 and 5, can be used to store the averages. The analysis is then repeated for different records. These additional samples could commence in essentially the same locations on the additional records as the initial sample. The threshold detector has been found to enable the sample to be taken from the equivalent locations within a maximum error of seventeen milliseconds.

The average decibel level for all frequency bands is determined for each sample. These values may be printed in graph form for easy comparison. Any analysis of the graphs will indicate which frequencies are poorly reproduced and which frequencies are accurately reproduced in each phonographic record as tested.

The embodiment of the invention, in accordance with the steps set forth in FIG. 10, is highly effective in analyzing modulated sound in order to determine record material quality and processing step quality. For example, the method of the present invention enables one to record an identical piece of modulated sound onto several record discs formed of slightly differing compositions or materials. Thereafter, these record discs can be compared almost precisely in the same way in order to determine which had the better reproduction of the sound, and hence better quality. Further, due to the fact that the method enables quantitative measurement, one can easily thereupon quickly analyze the data according to the quantitative basis and determine which record material presents the better quality.

The same steps as set forth above hold true in terms of analyzing the various steps in fabrication of a record disc. For example, one could use various types of molds or so-called "presses" in order to press the record disc from a master or stample and thereupon determine which copy of the record disc had the desired sound qualities and the associated mold which had produced that record disc.

All record discs contain a certain amount of surface noise. This noise may be an inherent characteristic of the material used in fabrication of a record disc. Moreover, certain defects in the disc, such as those caused by voids and contaminants in the material used in the formation of the disc create certain noise. The noise caused by defects is generally of a higher level than the surface noise. This high level noise may be called, for example, "ticks" and "pops." A "pop" is a high level noise across a wide range of frequencies, whereas a "tick" is a high frequency, high level noise.

Although an astute listener can identify a tick or a pop on a record disc, it is quite difficult, if not impossible, to quantitatively identify and to sort out or segregate ticks from pops and more difficult to quantitatively sort out ticks and pops from surface noise. Further, it is not possible for a listener to accurately audibly identify the location of ticks and pops, e.g., the sound spectrums in which they may occur. In addition, heretofore it has been virtually impossible to determine to what extent the noise on phonographic records is caused by the material, or caused by defects in the mold or other apparatus used to form the disc.

The method and apparatus of the present invention also provide a way to identify ticks and pops on unmodulated portions of a record disc, such as the cross-over areas between pieces of music. The causes of the ticks and pops found, can also be determined. In particular, the method described herein, along with the associated apparatus, makes it reasonably possible to determine whether the ticks and pops arise from the mold used to form the record disc, or from the material from which the disc is fabricated, or from other causes. The illustrated above described methods also enable one to determine if the ticks and pops were derived from the master or stample.

The threshold detector 38 is set to initiate the analysis when the sound level generated falls below a selected decibel level. The detector 38 thereby ensures that samples will only be taken during the play of unmodulated portions of the disc. Therefore, only surface noise and ticks and pops are sampled. However, as indicated above, it is possible to program the processor 30 to initiate the analysis when the sound level falls below a programmed threshold limit. In either case, the filter network 44 divides each selected sample into a plurality of sample segments, as described above. Each segment is of extremely short duration. For example, in a preferred embodiment of the invention, a segment lasts about thirty-one and one-fourth milliseconds; although this time period could be shortened or extended as desired.

In order to properly compare a set of samples from one disc with a set of similar samples from another disc, or a set of sample segments of one disc with a similar set of sample segments of another disc, it is desirable that the respective segments begin essentially at the same time and end at the same time. Therefore, the time duration of each segment must be statistically reasonably accurate. As already indicated, the threshold detector is reasonably accurate in order to insure that the respective samples begin at the same time. It should be understood that the requirement to start and stop analysis at the same time only has to be sufficient to provide a reasonably statistical comparison and it does not have to be exact.

Referring now to FIG. 11, as explained in more detail below, part of the analysis of unmodulated sound includes a comparison of the signals produced from at least two different records cut from the same mold. Ticks and pops that occur in the same position on a plurality of records are most likely caused by the mold. Therefore, in order for the comparisons to be meaningful, the sample segments compared must be produced from statistically accurate positions on the respective record discs.

As previously described, the filter network 44 divides the signal from each segment into a plurality of signals into different frequency bands. These signals are temporarily retained in the storage 46 until all of the segments have been sampled. The filter network 44 also computes the average decibel level of each frequency band over the thirty-one and one-fourth millisecond segment duration of each such frequency band. The next segment is then filtered and stored in the same way. This process continues until all thirty-six sample segments have been sampled.

At this point the analysis of unmodulated sound continues as illustrated in FIG. 11. All of this data which has previously been acquired may be stored in the read-only-memory or similar storage member. Various operations then can be performed upon the stored data to determine a number of quantities. In particular, the averaging circuit 50 can determine the average decibel for each segment, the average decibel level for the entire sample, the average decibel level for the spectra containing only surface noise, and the average decibel level for the spectra containing ticks and pops. These averages can be stored in the read-only-memory 56 for further processing.

The technique and the means and methods for identifying and segregating ticks and pops is hereinafter described in more detail. However, after the ticks and pops have been identified and more specifically, after the sample segments which contained the ticks and pops have been identified, they can be segregated from the remaining segments which contain only surface noise or other forms of noise which are not ticks and pops noise. The sample segments containing surface noise are stored and in like manner, the sample segments containing only ticks and pops are stored. Finally, the total sample content is stored and this total sample content will, of course, include those segments containing only surface noise and those segments containing ticks and pops as well.

In accordance with the method of the present invention, it is possible to present a three-dimensional profile in decibel level vs. frequency as a function of time. Thus, an x-axis may be a frequency axis and a y-axis may be a decibel level access and a z-axis may be a time domain axis, much in the manner as illustrated in FIG. 7.

By further reference, for example, to FIGS. 15–17, it can be observed that a three-dimensional format is presented and which may adopt the form of a print-out. This print-out is one specific example which discloses a total of sample content of 36 sample segments and in which each segment has the decibel level plotted as a function of the frequency. Certain of these sample segments (only one sample segment in this particular example) contains ticks and pops. The particular sample segment which contains ticks and pops is more specifically identified in FIG. 16 and which is also in accordance with the method as illustrated in FIG. 11. That sample segment is subtracted from the total content of FIG. 15 and therefore, when subtracted, only segments with surface noise exist. The remaining sample segments which do not include the particular segment containing ticks and pops, therefore, is illustrated in FIG. 17 and shows only the surface noise thereof. It can be observed that in all three displays or parts, the sample segment is plotted with decibel level as a function of frequency and all sample segments together constitute a single time domain of the entire sample.

At this juncture, it is possible to select any particular sample segment and present that sample segment in a two-dimensional format. In like manner, it is possible to take any channel and present the decibel level or as a function of each frequency band in a two-dimensional format, for purposes of analyzing any particular segment or any particular channel. An example of such plots is more specifically illustrated in FIGS. 18–20, as hereinafter described in more detail.

At this juncture an identification of ticks and pops, as hereinafter described, may be initiated. Tests have shown that ticks and pops may account for up to approximately ten percent (10%) of the total noise in a given sample. Moreover, the ticks and pops, due to their frequencies and decibel levels, are quite annoying to a listener of the modulated sound on a record disc. Therefore, it is of considerable importance to identify and separate out the ticks and pops. The ticks and pops are preferably identified, and more accurately defined, by statistical means in accordance with the present invention.

One of the preferred techniques to define and identify the ticks and pops is to use a non-parametric statistical system. This technique is schematically outlined in FIG. 14. Thus, in accordance with the present invention, a median decibel level number is established for each sample, or sample segment, and any noise level in excess of the median number by a statistical amount, e.g., three standard error are considered to be a tick or a pop.

It should be understood that the statistical deviation could vary depending on the noise levels encountered and on the desired level of noise reduction which may be desired. It should, therefore, be understood that other means could be employed for defining and thereby enabling segregation of ticks and pops. For example, by adding a certain decibel level to the median of each band, e.g., by adding two standard error to the decibel of each band to define a cut-off point, then approximately the lower ninety percent (90%) of the noise is effectively separated from the higher ten percent (10%) portion.

The median decibel of each band in each segment is compared with the tick and pop cut-off level for that segment. Also, in order to identify a sample segment or sample segments which contain ticks and pops, the segments containing at least two consecutive bands with medians greater than the cut-offs are identified as containing ticks and pops. The processor 30 working in connection with the read-only-memory 56 makes the comparisons and also places the data into the proper format for a permanent visual record to be made by the printer 32 and a temporary record to be made by the display apparatus 58.

These tests to determine existence of ticks and pops is repeated for three different areas on each record disc. Five records made from the same mold are preferably tested for the same three areas. The method along with the apparatus practicing the method are able to identify those records containing ticks and pops in the same area. A tick and pop appearing in the same position in a plurality of records indicates that the defect is in the mold and not in the material. On the other hand, if the ticks and pops appear randomly dispersed about the records, then the defect is most likely caused by the material used in the fabrication of the disc itself.

The information relating to frequency versus decibel level profile can be presented by the display 58, and this information can also be rendered into a hard copy by the printer 32, in a manner as hereinafter described. This information is highly effective in that many statistical evaluations can be made from the information or data. For example, distribution plots can be generated in order to determine highest frequency of noise content whether it be ticks and pops noise, or whether it be surface noise, or both. In addition, various other statistical distributions can be generated in order to make comparisons of materials and steps in fabrication processes or both. By virtue of the fact that the data which is generated is quantitative, this enables one to very accurately determine various levels of noise and the noise levels for particular frequency ranges. In addition, due to the fact that the data is quantitative, it also enables determination of frequency versus decibel level for given time increments.

Referring now to FIGS. 12 and 13, it can be observed that various extensions of the method of FIG. 11 can be performed. For example, the segments of surface noise which is stored separately from those segments containing the ticks and pops and which is, in turn, stored separately from the total sample content can be used such that an average of each channel is obtained across all segments. In other words, each channel which represents a particular frequency band, is averaged. Thereafter, a profile of the decibel level as a function of frequency is presented for only surface noise as for example of the kind illustrated in FIG. 20, a second profile in two-dimensional format for only ticks and pops can be presented, as illustrated in FIG. 19, and a third profile which represents an average of decibel level across all frequency bands can be presented for the entire sample, as illustrated in FIG. 18.

As a modification of the above, the method can also be performed in the manner as illustrated in FIG. 13. In this case, decibel level can be presented as a function of time in a profile of both ticks and pops and surface noise which constitutes the entire sample. A second two-dimensional profile can be presented with decibel level as a function of a time profile for ticks and pops and a third two-dimensional profile can be presented with decibel level as a function of a time profile for surface noise only, and not including ticks and pops. In this case, an index number is obtained which is in the average of decibel level across a time domain. In this specific embodiment a first index number which is an average of decibel level across the time domain for an entire sample is obtained. A second index number which is an average decibel level across the time domain for ticks and pops is obtained and finally, an average decibel level across the time domain for the surface noise is obtained as an index.

The identification of those spectra containing ticks and pops also allows the comparison of surface noise of various materials. Previously, materials were raised only on their overall noise content. Thus, a low surface noise material having a relatively large number of ticks and pops would be rated the same as a high surface noise material containing fewer ticks and pops. Therefore, materials containing a large number of ticks and pops would be discarded as unsuitable, even if their surface noise was, in fact, quite low. With the present method, the surface noise of various materials can be compared, and even more so quantitatively compared, to determine the material best suited for recording.

As indicated previously, it is necessary to determine whether any ticks and pops extend for a certain number of consecutive frequency bands, as for example, two or more frequency bands. This is provided to ensure that the high level frequencies which may be detected are indeed ticks and pops. In other words, ticks and pops may be high level frequencies over a specified range. If a high level frequency is detected in one range it may be random noise as opposed to a tick or a pop.

In accordance with the above outlined method, it can be observed that it is first of all possible to identify those high frequency noises referred to as ticks and pops. Secondly, it is possible to identify the surface noise generated in a particular record disc independently of the ticks and pops. Thirdly, it is possible to segregate the noise of the ticks and pops from the other surface noise. Finally, it is possible to provide representations of the surface noise individually, the noise of the ticks and pops individually, and the combined spectrum of surface noise and ticks and pops. This may be done on any one particular record in order to hopefully isolate the large portion of the ticks and pops or, for that matter, determine where the ticks and pops occurs in any particular record disc. In this way, it is possible to thereby determine a possible imperfection, or a possible problem in the fabrication process, or the like. Otherwise, if the surface noise and ticks and pops are uniformly distributed throughout several records then it is possible to compare records in order to determine which material or fabrication process might be better than another material or fabrication process.

As used herein, the term "quantitative" with respect to the measuring and analysis is used in a relative sense. In many cases, while the frequency ranges can be measured in Hertz which may be absolute, and the noise may be measured in decibel levels, which may be an absolute measurement, comparisons of frequency range from one record disc to another or one portion of a disc to another portion of the same disc and comparison of decibel levels from one record disc to another disc and one portion of a record disc to another portion of the same record disc may be done on a relative basis. Notwithstanding, the measurements are also presented in quantitative amounts. In other words, while a decibel level as measured for a particular frequency range may be a relative number, the same parameters can be used to measure like data from another record disc or another portion of the same record disc. Consequently, when using the same parameters the data itself is truly quantitative.

The printer 32 and/or the display 58 produce graphic representations of the data. However, as indicated above, any other conventional means of producing a hard or permanent copy may be used, such as a plotter or the like. Preferably, although not necessarily, any such printer or plotter, or the like, should be capable of producing axis indicia, e.g., frequency ranges, decibel levels, time or the like.

Also, in accordance with the present invention, all spectrum of a sample can be displayed and/or reproduced in a single image, such as shown in FIG. 15, as aforesaid. Thus, for example, a first image showing all portions of the spectrum of a sample may be presented as shown in this FIG. 15. Inasmuch as the apparatus and method of the present invention enables discrimination of the ticks and pops from surface noise, the ticks and pops may be located in one or more particular spectrums and thereafter presented as shown in FIG. 16. Finally, the surface noise alone, without ticks and pops, may be presented as shown in FIG. 17.

FIGS. 15-17 illustrate such representations of the decibel level as a function of frequencies averaged over the entire thirty-six segments, or spectra, of a sample. FIG. 15 shows all noise measured including surface noise and ticks and pops. Nevertheless, it becomes apparent that the ticks and pops can be observed and identified by particular spectrum content. That is highly effective in enabling the spectrum containing ticks and pops to be identified and presented separately as shown in FIG. 16. Thereafter, only surface noise can be presented, as shown in FIG. 17, and all such presentations are made in three axis or three-dimensional format.

FIG. 19 illustrates a diagram of decibel level averged over only one segment, which is the segment, because of its relatively high decibel levels, which was selected as containing ticks and pops. A comparison between FIGS. 18 and 20 clearly reveals the relatively high decibel level contained in the segment of FIG. 19 which identifies this segment as containing ticks and pops. In this particulr example the ticks and pops occur only in a single spectrum. Thus, by extracting this particular spectrum it is evident the remaining spectrum contains only surface noise. The difference in the noise levels between FIGS. 18 and 20 is quite evident.

FIG. 15 illustrates all thirty-six segments taken in a sample. The single segment containing ticks and pops shown in FIG. 15 is easily identifiable in FIG. 16. The decibel level is plotted along the Y axis and frequency is plotted along the X axis. The Z axis of the three-dimensional plots represents a time axis, inasmuch as it also represents each of the individual sample segments or spectrums. The three-dimensional plot allows the display of all thirty-six segments of a sample simultaneously.

FIG. 16 illustrates that segment identified as containing ticks and pops positioned in the same time frame. Since the starting point of the sample is precise, as are the durations of each of the individual segments, by identifying each segment in its time frame, comparisons can be made among different samples to determine if the ticks and pops appear in the same location on a plurality of records.

FIG. 17 shows the three-dimensional graph of all of the segments containing surface noise. The segment containing ticks and pops is not illustrated in this FIG. 17.

It can be observed that the apparatus and the method of the present invention provide a highly effective way to enable identifying the location of various noises on a record disc quantitatively, and thereafter quantitatively measuring that noise. Further, the apparatus and method provide a unique way of locating and measuring noise with reference to a time frame. This can be accomplished with a single record disc in order to determine parameters outside of the record disc and the apparatus and the method can also be used to perform determinations of this type among various record discs in order to provide a comparison.

As indicated above, statistical methods may be used in order to determine data about the measurements. For example, the mean and median of noise level may be determined for each sample or for each one-third ($\frac{1}{3}$) octave band. This provides a representation of the value and level of what the ticks and pops may be. Further, in accordance with the method and the apparatus it is possible to literally count the ticks and pops to determine their existence with reference to a time frame.

Thus, there has been illustrated and described a unique and novel method and apparatus for measuring and analyzing sound characteristics of a record disc on a quantitative basis to enable evaluation of such characteristics and which, therefore, fulfills all of the objects and advantages sought therefor. It should be understood that many changes, modifications, variations and other uses and applications of the apparatus and method of the present invention will become apparant to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by letters patent is:

1. A method of quantitatively measuring only either of modulated sound or unmodulated sound from a phonographic type record disc and using such quantitative measurement to improve sound recording, said method comprising:
  (a) selecting at least one sample on a phonographic type record disc for purposes of measurement,
  (b) generating an electrical signal representative of sound from the selected sample of the phonographic type record disc,
  (c) filtering said signal to obtain individual frequency bands,
  (d) obtaining a statistical measure of the frequency for each frequency band as a function of decibel level,
  (e) storing the statistical measure for at least certain of the frequency bands until such measure has been made for such certain frequency bands in the sample, and
  (f) presenting a profile of the decibel level with respect to frequency for the selected sample in order to enable evaluation of the modulated or the unmodulated sound characteristics of that record disc.

2. The method of claim 1 further characterized in that said
  (a) establishing a threshold level, and
  (b) initiating the selecting of a sample when the threshold level has been achieved and determined.

3. The method of claim 1 further characterized in that the statistical measure is an average of frequency as a function of decibel level, said method comprises at least temporarily storing the determined average of the decibel level for a certain frequency band until the average of decibel level for each frequency band in the sample has been determined.

4. The method of claim 3 further characterized in that the average of the decibel level for the frequency band in the sample is stored and the process is repeated with different phonographic type record discs in order to compare the decibel level versus frequency profiles for each record disc.

5. A method for quantitatively measuring and analyzing a sound spectrum from a sound producing copy of a phonographic type record disc which was produced from a master, and where a means on the disc to produce discrete portions of the sound in the spectrum are not readily discernable by visual observation, said method comprising:
   (a) generating electrical signals representative of sound from a copy of a phonographic type record disc,
   (b) processing said electrical signals and generating a plurality of individual signal components with each representing decibel level as function of frequency for discrete increments of time,
   (c) temporarily storing the individual signal components until the electrical signals thus generated have been processed,
   (d) plotting the signal components representing decibel level as a function of frequency for each such discrete increment of time, and
   (e) determining from the plotted signal components the existence of unwanted noise in the second spectrum of said copy of the record disc and thereby determining from the copy of the record disc if said unwanted noise occurred in or was derived from the master of the record disc used to produce said copy.

6. The method of claim 5 further characterized in that said electrical signals are proportional to the sounds generated from the copy of the record disc.

7. The method of claim 6 further characterized in that said method measures and analyzes unmodulated sound.

8. The method of claim 5 further characterized in that the electrical signals are generated for one-third octave bands.

9. A method of quantitatively measuring sounds from a phonographic type record disc and using such quantitative measurements to improve sound recording, said method comprising:
   (a) selecting at least one sample on a phonographic type record disc for purposes of measurement,
   (b) generating an electrical signal representative of sound of that sample from the phonographic type record disc,
   (c) dividing the signal into individual frequency bands of predetermined frequency ranges,
   (d) determining an average decibel level for each frequency band,
   (e) generating a first printed or displayed record member representative of the sound from the record disc and in which frequency is illustrated as a function of decibel level,
   (f) repeating steps (a) through (e) for at least one additional sample from a different location on a record disc to thereby generate a second printed or displayed record member, and
   (g) comparing the first printed or displayed record member against the second printed or displayed record member to thereby attempt to determine the possible source of imperfections in the sound recordings.

10. The method of claim 9 further characterized in that said method comprises:
   (a) establishing a threshold level to initiate a measurement, and
   (b) initiating a measurement when the threshold level has been achieved and determined.

11. The method of claim 9 further characterized in that said additional sample is from a different location on the same record disc.

12. The method of claim 9 further characterized in that said additional sample is from a different location on a different record disc.

13. The method of claim 9 further characterized in that the method comprises filtering the selected samples into one-third octave bands for each of the selected samples.

14. The method of claim 9 further characterized in that the measurement of a sample is made over a predetermined time interval and the frequency is illustrated as a function of decibel level with respect to a given time period.

15. A method of quantitatively measuring unmodulated sound from a sound producing copy of a phonographic type record disc to thereby determine record disc quality, said method comprising:
   (a) generating electrical signals representative of unmodulated sound from a phonographic type record disc where imperfections on the disc giving rise to the unmodulated sound are not readily discernable by visual observation,
   (b) processing said electrical signals and generating a first signal function representing unmodulated surface noise from said record disc, if any, and generating a second signal function representing ticks and pops, if any, from said record disc, and generating a third signal function representing a combination of surface noise and ticks and pops,
   (c) plotting the first signal function to obtain a plot of the surface noise without ticks and pops,
   (d) plotting the second signal function to obtain a plot of ticks and pops,
   (e) plotting the third signal function to obtain a plot of combined surface noise and ticks and pops, and
   (f) determining from the plotted signal functions the level and location of ticks and pops in the copy of the record disc and the possible source of said ticks and pops.

16. The method of claim 15 further characterized in that the method comprises also determining the location of the ticks and pops relative to a pre-established time frame from said plotted signal functions.

17. The method of claim 16 further characterized in that in the step of processing the electrical signals, the second signal function is subtracted from the third signal function to obtain the first signal function.

18. The method of claim 16 further characterized in that in the step of processing the electrical signals, the first signal function and the second signal function are represented by signal components which represent decibel levels as a function of frequency.

19. The method of claim 18 further characterized in that the third signal function is also represented by signal components which represent decibel levels as a function of frequency.

20. The method of claim 19 further characterized in that the signal functions represent decibel level as a function of frequency for discrete increments of time.

21. The method of claim 20 further characterized in that in the steps of plotting the signal functions, the signal components are plotted with decibel level as a function of frequency for each discrete increment of time.

22. The method of claim 21 further characterized in that the method comprises determining from the plotted signal functions the existence of unwanted noise in the unmodulated sound of said copy of the record disc and thereby determining from the copy of the record disc if said unwanted noise occurred in or was derived from a master of the record disc which was used to produce said copy.

23. A method of quantitatively measuring unmodulated sound from a sound producing copy of a phonographic record disc, said method comprising:
   (a) generating a signal from the unmodulated sound portion of the record disc representing a total spectrum of noise, including surface noise and ticks and pops, if any,
   (b) determining from the signal representing the total spectrum of noise, decibel levels at certain frequencies substantially above the surface noise and thereby determining the existence of ticks and pops in the total spectrum of noise, and
   (c) locating the ticks and pops in the total spectrum as a function of time in the predetermined time interval.

24. The method of claim 23 further characterized in that said method comprises generating a plot of the total spectrum of noise and a plot of the background noise and a plot of the ticks and pops for quantitatively evaluating the ticks and pops.

25. The method of claim 24 further characterized in that the plots are comprised of decibel levels as a function of frequency.

26. The method of claim 24 further characterized in that the plots are comprised of decibel levels as a function of frequency and function of time.

27. The method of claim 23 further characterized in that said method comprises measuring sound in the cross-over regions.

28. An apparatus for quantitatively measuring sound from a phonographic type record disc to enable improvement of sound recording from such quantitative measurements, said apparatus comprising:
   (a) signal generating means for generating electrical signals representative of sound from a phonographic type record disc,
   (b) means operatively connected to the signal generating means for filtering and dividing the electrical signals into individual frequency bands of predetermined frequency, and averaging the decibel levels for each of the frequency bands with respect to a selected frequency intermediate the end frequencies of each such band to thereby obtain an average of the decibel level for each of the frequencies in each of the individual frequency bands,
   (c) temporary storage means operatively connected to the means for averaging, for storing the determined average for a frequency band until the average for each band in the sample has been determined, and
   (d) means for generating a presentation representative of the sound from the record disc and in which decibel level versus frequency is one of the parameters presented to thereby enable evaluation of the sound characteristics of that record disc.

29. The apparatus of claim 28 further characterized in that threshold level means is operatively connected to said signal generating means and initiates selection of a sample and generation of a signal when a preselected threshold has been achieved.

30. The apparatus of claim 28 further characterized in that said filter means is adapted to select sample increments from a one-third octave band.

31. The apparatus of claim 28 further characterized in that additional storage means is provided for storing the determined average for a frequency band until the average for each band in a sample has been determined.

32. The apparatus of claim 28 further characterized in that said apparatus measures modulated sound.

33. The apparatus of claim 28 further characterized in that said apparatus measures unmodulated sound.

34. The apparatus of claim 28 further characterized in that means are provided for selecting a plurality of individual samples which are evaluated from a selected phonograph-type record disc in which a spectrum containing ticks and pops is identified.

35. Apparatus for quantitatively measuring and analyzing only either of a modulated sound spectrum or an unmodulated sound spectrum from a sound producing copy of a phonographic type record disc and where a means on the disc to produce discrete portions of the sound in the spectrum are not readily discernable by visual observaton, said apparatus comprising:
   (a) generating means for generating electrical signals representative of sound from a copy of a phonographic type record disc,
   (b) signal processing means for processing said electrical signals,
   (c) means for receiving the processed electrical signals and generating a plurality of individual signal components with each representing decibel levels as a function of frequency for discrete increments of time, and
   (d) presentation means for plotting the signal components representing decibel levels as a function of frequency for each such discrete increment of time to thereby determine from the plotted signal components the existence of unwanted noise in the modulated or unmodulated sound spectrum of said copy of the record disc and thereby determining from the copy of the record disc if said unwanted noise occurred in or was derived from the master of the record disc used to produce said copy.

36. The apparatus of claim 35 further characterized in that said electrical signals are proportional to the sounds generated from the copy of the record disc.

37. The apparatus of claim 36 further characterized in that the electrical signals are generated for one-third octave bands.

38. The apparatus of claim 36 further characterized in that said apparatus measures and analyzes unmodulated sound.

39. A method of quantitatively measuring sound from a phonographic type record disc and using such quantitative measurement to improve sound recording, said method comprising:
   (a) selecting a plurality of sampling locations on at least one phonographic type record disc for purposes of measurement, and where all of said sampling locations constitute one sample in combination,
   (b) generating electrical signals representative of sound from the selected samples locations,
   (c) filtering said signals to obtain individual frequency bands, and decibel levels for each of the frequency bands,
   (d) making a statistical measure of the decibel levels for channels comprising increments of the frequency band over a selected time period for each of the sampling locations, and (e) presenting a profile of the decibel level with respect to frequency for the statistical measure across the channel in the selected sampling locations in order to enable evaluation of the sound characteristics of that record disc.

40. The method of claim 39 further characterized in that said method comprises:
   (a) establishing a threshold level, and
   (b) initiating the selecting of a sample when the threshold level has been achieved and determined.

41. The method of claim 39 further characterized in that said method comprises at least temporarily storing the determined average of the decibel level for a certain frequency band until the average of decibel level for each frequency band in the sample has been determined.

42. A method of quantitatively measuring modulated sound from a phonographic type record disc and using such quantitative measurement to improve sound recording, said method comprising:
   (a) selecting at least one sample of modulated sound on a phonographic type record disc for purposes of measurement,
   (b) generating an electrical signal representative of sound from the selected sample of the phonographic type record disc,
   (c) filtering said signal to obtain individual frequency bands,
   (d) determining an average of the decibel level for each of the frequency bands in the sample,
   (e) temporarily storing the determined average of the decibel level for each frequency band until the averge of all frequency bands in the sample has been determined, and
   (f) presenting a profile of the decibel level with respect to frequency for the selected sample in order to enable evaluation of the sound characteristics of that record disc.

43. A method of quantitatively measuring unmodulated sound from a phonographic type record disc and using such quantitive measurement to improve sound recording, said method comprising:
   (a) selecting at least one sample of unmodulated sound on a phonographic type record disc for purposes of measurement,
   (b) generating an electrical signal representative of sound from the selected sample of the phonographic type record disc,
   (c) filtering said signal to obtain individual frequency bands,
   (d) determining an average of the decibel level for each of the frequency bands in the sample,
   (e) temporarily storing the determined average of the decibel level for each frequency band until the average of all frequency bands in the sample has been determined, and
   (f) presenting a profile of the decibel level with respect to frequency for the selected sample in order to enable evaluation of the sound characteristics of that record disc.

44. A method of quantitatively measuring sound from a phonographic type record disc and using such quantitative measurement to improve sound recording, said method comprising:
   (a) selecting a plurality of individual sample portions in at least one sample on a phonographic type record disc for purposes of meausrment,
   (b) generating an electrical signal representative of sound from the selected sample of the phonographic type record disc,
   (c) filtering said signal to obtain individual frequency bands,
   (d) determining an average of the decibel level for each of the frequency bands in the sample,
   (e) temporarily storing the determined average of the decibel level for each frequency band until the average of all frequency bands in the sample has been determined, and
   (f) presenting a profile of the decibel level with respect to frequency for the selected sample in order to enable evaluation of the sound characteristics of that record disc and thereby identifying a spectrum containing ticks and pops from such sample portions.

45. The method of claim 44 further characterized in that the method comprises determining an average of the ticks and pops and determining an average of the surface noise.

46. The method of claim 45 further characterized in that the method comprises presenting a decibel level versus frequency profile for ticks and pops of all sample portions from a disc and presenting a decibel level versus frequency profile for surface noise of all sample portions from a disc.

47. A method for quantitatively measuring and analyzing a sound spectrum from a sound producing copy of a phonographic type record disc and where a means on the disc to produce discrete portions of the sound in the spectrum are not readily discernable by visual observation, said method comprising:
   (a) generating electrical signals representative of sound from a copy of a phonographic type record disc,
   (b) processing said electrical signals and generating a plurality of individual signal components with each representing decibel level as a function of frequency for discrete increments of time,
   (c) plotting the signal components representing decibel level as a function of frequency for each such discrete increment of time to produce three dimensional plots in which frequency is represented by one of the axes, decibel level by another of the axes and increments of time by a third of the axes, and
   (d) determining from the plotted signal components the existence of unwanted noise in the sound spectrum of said copy of the record disc and thereby determining from the copy of the record disc if said unwanted noise occurred in or was derived from the master of the record disc used to produce said copy.

48. A method for quantitatively measuring and analyzing an unmodulated sound spectrum from a sound producing copy of a phonographic type record disc and where a means on the disc to produce discrete portions of the sound in the spectrum are not readily discernable by visual observation, said method comprising:
   (a) generating electrical signals representative of sound from a copy of a phonographic type record disc,
   (b) processing said electrical signals and generating a plurality of individual signal components with each representing decibel level as a function of frequency for discrete increment of time, (c) plotting the signal components representing decibel level as a function of frequency for each such discrete increment of time to thereby generate
   (1) a first plot illustrating at least decibel level as a function of frequency for a total sound spectrum,
   (2) a second plot illustrating at least decibel level as a function of frequency for surface noise only, and
   (3) a third plot illustrating at least decibel level as a function of frequency for ticks and pops,
(d) determining from the plotted signal components the existence of unwanted noise in the sound spectrum of said copy of the record disc and thereby determining from the copy of the record disc if said unwanted noise occurred in or was derived from the master of the record disc used to produce said copy.

49. The method of claim 48 further characterized in that each of said plots are three dimensional with frequency shown as a function of decibel level for each of the meansured time increments.

50. The method of claim 49 further characterized in that the unmodulated sound is sampled and evaluated from cross-over regions.

51. The method of claim 48 further characterized in that electrical signals representative of the ticks and pops are generated relative to electrical signals representative of other surface noise from the record disc.

52. A method of quantitatively measuring sounds from a phonographic type record disc and using such quantitive measurements to improve sound recording, said method comprising:
(a) selecting at least one sample on a phonographic type record disc for purposes of measurement,
(b) generating an electrical signal representative of sound of that sample from the phonographic type record disc,
(c) dividing the signal into individual frequency bands of predetermined frequency ranges,
(d) determining an average decibel level for each frequency band,
(e) generating a printed record member representative of the sound of ticks and pops from the record disc and in which frequency is illustrated as a function of decibel level, and
(f) repeating steps (a) through (e) for at least one additional sample and presenting the sound of ticks and pops relative to the sound of at least one additional sample to thereby determine the possible source of imperfections in the sound recordings.

53. The method of claim 52 further characterized in that only unmodulated sound is sampled and quantitatively evaluated.

54. The method of claim 53 further characterized in that the unmodulated sound is sampled and evaluated from cross-over regions.

55. An apparatus for quantitatively measuring sound from a phonographic type record disc to enable improvement of sound recording from such quantitative measurements, said apparatus comprising:
(a) means for selecting a plurality of individual samples which are to be evaluated from a selected phonograph-type record disc in which a sprectrum containing ticks and pops is identified,
(b) signal generating means for generating electrical signals representative of sound from a phonographic type record disc,
(c) filter means operatively connected to the signal generating means and dividing the electrical signals into individual frequency bands of predetermined frequency, and averaging the decibel levels for each of the frequency bands,
(d) temporary storage means operatively connected to the means for averaging, for storing the determined average for a frequency band for each band in the sample,
(e) additional storage means for storing the determined average for a frequency band for each frequency band in the sample until the average for each band in the sample has been determined, and retaining at least certain of the determined averages, and
(f) means for generating a presentation representative of the sound from the record disc and in which decibel level versus frequency is one of the parameters presented to thereby enable evaluation of the sound charcteristics of that record disc.

56. The apparatus of claim 55 further characterized in that the means for generating a presentation presents a decibel level versus frequency profile for ticks and pop and presents an average of the surface noise.

57. The apparatus of claim 56 further characterized in that the means for generating a presentation presents a decibel level versus frequency profile for ticks and pops of all samples of a disc and presents a decibel level versus frequency profile for surface noise of all samples from a disc.

58. Apparatus for quantitatively measuring and analyzing a sound spectrum from a sound producing copy of a phonographic type record disc and where a means on the disc to produce discrete portions of the sound in the spectrum are not readily discernable by visual observation, said method comprising:
(a) generating means for generating electrical signals representative of sound from a copy of phonographic type record disc,
(b) signal processing means for processing said electrical signals,
(c) means for receiving the processed electrical signals and generating a plurality of individual signal components with each representing decibel levels as a function of frequency for discrete increments of time, and
(d) presentation means for plotting the signal components representing decibel levels as a function of frequency for each such discrete increment of time to present three dimensional plots of the signal components in which frequency is represented by one of the axes, decibel level by another of the axes and increments of time by a third of the axes, to thereby determine from the plotted signal components the existence of unwanted noise in the sound spectrum of said copy of the record disc and thereby determining from the copy of the record disc if said unwanted noise occurred in or was derived from the master of the record disc used to produce said copy.

59. Apparatus for quantitatively measuring and analyzing a sound spectrum from a sound producing copy of a phonographic type record disc and where a means on the disc to produce discrete portions of the sound in the spectrum are not readily discernable by visual observation, said apparatus comprising:

(a) generating means for generating electrical signals representative of sound from a copy of phonographic type record disc,
(b) signal processing means for processing said electrical signals,
(c) means for receiving the processed electrical signals and generating a plurality of individual signal components with each representing decibel levels as a function of frequency for discrete increments of time, and
(d) presentation means for plotting the signal components representing decibel levels as a function of frequency for each such discrete increment of time, said presentation means being adapted to:
(1) generate a first plot illustrating at least decibel level as a function of frequency for a total sound spectrum,
(2) generate a second plot illustrating at least decibel level as a function of frequency for surface noise only, and
(3) generate a third plot illustrating at least decibel level as a function of frequency for ticks and pops, to thereby determine from the plotted signal components the existence of unwanted noise in the sound sprectrum of said copy of the record disc and thereby determining from the copy of the record disc if said unwanted noise occurred in or was derived from the master of the second disc used to produce said copy.

60. The apparatus of claim 59 further characterized in that each of said plots are three dimensional with frequency shown as a function of decibel level for each of the measured time increments.

61. A method of quantitatively measuring sound from a phonographic type record disc and using such quantitative measurement to improve sound recording, said method comprising:
(a) selecting a plurality of sampling locations on at least one single selected phonographic type record disc for purposes of measurement, and where all of said sampling locations constitute one sample in combination,
(b) generating electrical signals representative of sound from the selected samples locations,
(c) filtering said signals to obtain individual frequency bands and decibel levels for each of the frequency bands,
(d) making a statistical measure of the decibel levels for channels of the frequency band for each of the sampling
(e) presenting a profile of the decibel level with respect to frequency for the statistical measure across the channel in the selected sampling locations in order to enable evaluation of the sound characteristics of that record disc and indentify a spectrum containing ticks and pops from the sample.

62. The method of claim 61 further characterized in that the method comprises determining an average of the ticks and pops and determining an average of the surface noise.

63. The method of claim 62 further characterized in that the method comprises presenting a decibel level versus frequency profile for ticks and pops of all sampling locations from a disc and presenting a decibel level versus frequency profile for surface noise of all sampling locations from a disc.

64. A method of quantitatively measuring sounds from a phonographic type record disc and using such quantitative measurements to improve sound recording, said method comprising:
(a) selecting at least one first sample on a phonographic type record disc for purposes of measurement,
(b) generating an electrical signal representative of sound of that first sample from the phonographic type record disc,
(c) dividing the signal into individual frequency bands of predetermined frequency ranges,
(d) determining an average decibel level for each frequency band,
(e) repeating steps (a) through (d) for at least one additional sample at a different location to thereby determine the possible source of imperfections in the sound recordings,
(f) averaging the averages of the decibel level for each frequency band in the first sample and in the second sample to obtain an overall average of frequency with respect to decibel level, and
(g) generating a printed or displayed record member representative of the sound from the record disc and in which frequency of said first and additional samples is illustrated as a function of decibel level.

65. The method of quantitatively measuring sounds of claim 64 further characterized in that said method comprises generating printed or displayed record members for the first and additional samples and comparing the first printed or displayed record member against the additional printed or displayed record member to thereby attempt to determine the possible source of imperfections in the sound recordings.

66. An apparatus for quantitatively measuring sound from a phonographic type record disc to enable improvement of sound recording from such quantitative measurements, said apparatus comprising:
(a) signal generating means for generating electrical signals representative of sound from a phonographic type record disc,
(b) filter means operatively connected to the signal generating means and dividing the electrical signals into individual frequency bands of predetermined frequency, and averaging the decibel levels for each of the frequency bands,
(c) temporary storage means operatively connected to the means for averaging, for storing the determined average for a frequency band until the average for each band in the sample has been determined,
(d) processing means operable in conjunction with said filter means and temporary storage means for making a further averaging of the bands or portions thereof in the sample, and
(e) means for generating a presentation representative of the sound from the record disc and in which decibel level versus frequency is one of the parameters presented to thereby enable evaluation of the sound characteristics of that record disc.

* * * * *